(12) United States Patent
Liu et al.

(10) Patent No.: US 12,117,594 B2
(45) Date of Patent: Oct. 15, 2024

(54) OPTICAL SYSTEM, LENS MODULE, AND ELECTRONIC DEVICE

(71) Applicant: JIANGXI JINGCHAO OPTICAL CO., LTD., Jiangxi (CN)

(72) Inventors: Binbin Liu, Jiangxi (CN); Ming Li, Jiangxi (CN); Hairong Zou, Jiangxi (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 572 days.

(21) Appl. No.: 17/465,927

(22) Filed: Sep. 3, 2021

(65) Prior Publication Data

US 2021/0396973 A1    Dec. 23, 2021

Related U.S. Application Data

(63) Continuation of application No. PCT/CN2020/082596, filed on Mar. 31, 2020.

(51) Int. Cl.
  *G02B 13/00*    (2006.01)
  *G02B 9/64*    (2006.01)

(52) U.S. Cl.
  CPC .......... *G02B 13/0045* (2013.01); *G02B 9/64* (2013.01)

(58) Field of Classification Search
  CPC . G02B 3/02; G02B 5/208; G02B 9/64; G02B 13/0045; G02B 13/18; G02B 15/1461; G02B 27/0012; G02B 27/0025; H04N 5/222; H04N 23/55
  USPC ....... 359/350, 357, 657, 671, 682, 708, 751, 359/755
  See application file for complete search history.

(56) References Cited

U.S. PATENT DOCUMENTS

| | | | |
|---|---|---|---|
| 10,795,125 B2* | 10/2020 | Zhao | .................. G02B 13/0045 |
| 2010/0060996 A1 | 3/2010 | Ozaki | |
| 2017/0199350 A1 | 7/2017 | Teraoka | |

(Continued)

FOREIGN PATENT DOCUMENTS

| CN | 109358415 A | 2/2019 |
|---|---|---|
| CN | 109491051 A | 3/2019 |

(Continued)

OTHER PUBLICATIONS

The extended European search report issued in corresponding EP application No. 20924981.2 dated Nov. 8, 2022.

(Continued)

*Primary Examiner* — Stephone B Allen
*Assistant Examiner* — Daniel Jeffery Jordan
(74) *Attorney, Agent, or Firm* — HAUPTMAN HAM, LLP

(57) ABSTRACT

An optical system, a lens module, and an electronic device are provided. The optical system includes, in order from an object side to an image side, a first lens, a second lens, a third lens, a fourth lens, a fifth lens, a sixth lens with, and a seventh lens. The first lens has an object-side surface which is convex at an optical axis and an image-side surface which is concave at the optical axis and at a circumference. The second lens has an object-side surface which is convex at the optical axis and an image-side surface which is concave at the optical axis and at a circumference. The seventh lens has an image-side surface, which is concave at the optical axis and has at least one inflection point. The optical system satisfies the following expression: f/EPD<1.7.

18 Claims, 20 Drawing Sheets

(56) References Cited

U.S. PATENT DOCUMENTS

2019/0079270 A1* 3/2019 Tseng .................... G02B 13/18
2019/0369362 A1 12/2019 Son et al.
2022/0035124 A1* 2/2022 Yoshinaga ......... G02B 15/1461

FOREIGN PATENT DOCUMENTS

| CN | 109828350 A | 5/2019 |
| CN | 109828351 A | 5/2019 |
| CN | 109828352 A | 5/2019 |
| CN | 109828357 A | 5/2019 |
| CN | 109839717 A | 6/2019 |
| CN | 110879459 A | 3/2020 |
| SU | 1078393 A1 | 3/1984 |
| SU | 1432440 A1 | 10/1988 |

OTHER PUBLICATIONS

The International Search Report issued in corresponding International Application No. PCT/CN2020/082596, mailed Dec. 31, 2020, pp. 1-9, Beijing, China.

* cited by examiner

OPTICAL SYSTEM, LENS MODULE, AND ELECTRONIC DEVICE

CROSS-REFERENCE TO RELATED APPLICATION (S)

This application is a continuation of International Application No. PCT/CN2020/082596, filed on Mar. 31, 2020, the disclosure of which is hereby incorporated by reference in its entirety.

TECHNICAL FIELD

This disclosure relates to the technical field of optical imaging, and in particular to an optical system, a lens module with the optical system, and an electronic device.

BACKGROUND

Nowadays, with the rapid development of technology, consumers have a higher demand for imaging quality of mobile electronic products. At present, a five-piece optical system is more mature, but resolution of the five-piece optical system is increasingly unable to meet needs of consumers. Compared with the five-piece optical system, a seven-piece optical system has obvious advantages, which can obtain higher resolution and can be used in high-end mobile electronic products, to improve picture quality, resolution and definition.

However, the current seven-piece optical system is not yet developed. In a night scene, a rainy day, a starry sky, or other dark environments, the photographing effect is still not satisfactory. Therefore, how to further improve the seven-piece optical system to overcome the problem in the dark environment for a better photographing effect has become a key point.

SUMMARY

The present disclosure aims to provide an optical system that has a better photographing effect even at dark conditions.

To this end, the disclosure provides the following technical solutions.

According to a first aspect, an optical system is provided. The optical system includes, in order from an object side to an image side, a first lens with a positive refractive power, a second lens with a refractive power, a third lens with a refractive power, a fourth lens with a refractive power, a fifth lens with a refractive power, a sixth lens with a refractive power, and a seventh lens with a negative refractive power. The first lens has an object-side surface which is convex at an optical axis and an image-side surface which is concave at the optical axis and at a circumference. The second lens has an object-side surface which is convex at the optical axis and an image-side surface which is concave at the optical axis and at a circumference. The seventh lens has an image-side surface, which is concave at the optical axis and has at least one inflection point. The optical system satisfies the following expression f/EPD<1.7, where f represents an effective focal length of the optical system, and EPD represents an entrance diameter of the optical system. As such, the optical system can have a large optical aperture and thus a larger amount of light may enter the optical system, improving a photographing effect at dark conditions and resulting in a better imaging effect, by appropriately configuring refractive powers and surface profiles from the first lens to the seventh lens and simultaneously satisfying the value of f/EPD less than 1.7.

In an implementation, the optical system satisfies the following expression TTL/Imgh<1.7, where TTL represents a distance on the optical axis from the object-side surface of the first lens to an imaging surface of the optical system, and Imgh represents half of a diagonal length of an effective photosensitive area on the imaging surface of the optical system. As such, the optical system can have an ultra-thin characteristic, realizing a compact size of the optical system, by satisfying the value of TTL/Imgh less than 1.7.

In an implementation, the optical system satisfies the following expression f*tan(HFOV)>5.15 mm, where HFOV represents half of an angle of view of the optical system. As such, the optical system can have a great image plane and thus have a characteristic of high resolution and high definition, by satisfying the value of f*tan(HFOV) greater than 5.15 mm.

In an implementation, the optical system satisfies the following expression 1<TTL/f<1.5, where TTL represents a distance on the optical axis from the object-side surface of the first lens to an imaging surface of the optical system. By configuring the value of TTL/f between 1 and 1.5, a ratio of a total length to a focal length of the system can be controlled to be less than 1.5, so that the optical system can have a characteristic of compact size; at the same time, the ratio can be controlled to be greater than 1, so that a sensitivity of the optical system can be weakened, which facilitates processing and production for products.

In an implementation, the optical system satisfies the following expression 0.5<|R5/R6|<1.5, where R5 represents a radius of curvature of an object-side surface of the third lens at the optical axis, and R6 represents a radius of curvature of an image-side surface of the third lens at the optical axis. It is possible to facilitate processing for the third lens and effectively reduce the sensitivity of the optical system at the third lens, by satisfying the value of |R5/R6| between 0.5 and 1.5.

In an implementation, the optical system satisfies the following expression 0.5<TTH2/CT3<1.5, where TTH2 represents an air spacing distance on the optical axis from the second lens to the third lens, and CT3 represents a thickness of the third lens on the optical axis. It is possible to effectively reduce a sensitivity of the optical system and facilitate processing and productions for products, by satisfying the value of TTH2/CT3 between 0.5 and 1.5.

In an implementation, the optical system satisfies the following expression |f1/f5|<2, where f1 represents an effective focal length of the first lens, and f5 represents an effective focal length of the fifth lens. It is possible to reasonably control distribution of optical effective focal lengths of the first lens and the fifth lens, and effectively correct a longitudinal chromatic aberration of the optical system, by satisfying the value of |f1/f5| less than 2.

In an implementation, the optical system satisfies the following expression 0.2<ET2/CT2<1.3, where ET2 represents a thickness of an edge of an optical effective area of the second lens, and CT2 represents a thickness of the second lens on the optical axis. It is possible to control a ratio of an edge thickness of the second lens to a center thickness of the second lens within a suitable range, and facilitate processing and productions for the second lens, by satisfying the value of ET2/CT2 between 0.2 and 1.3.

In an implementation, the optical system satisfies the following expression TTL/f1≤1.5, where TTL represents a distance on the optical axis from the object-side surface of the first lens to an imaging surface of the optical system, and f1 represents an effective focal length of the first lens. It is possible to reasonably control a refractive power of the first lens for avoiding excessive increase of the refractive power of the first lens and guaranteeing a relatively short total length of the optical system, by satisfying the value of TTL/f1 within 1.5.

In an implementation, the optical system satisfies the following expression EPD/R1<1.5, where R1 represents a radius of curvature of the object-side surface of the first lens at the optical axis. It is possible to effectively guarantee a rationality of an incident light deflecting at the first lens, by satisfying the value of EPD/R1 less than 1.5.

In an implementation, the optical system satisfies the following expression sd61/sd52≤1.3, where sd61 represents a clear aperture of an object-side surface of the sixth lens at a maximum angle of view, and sd52 represents a clear aperture of an image-side surface of the fifth lens at the maximum angle of view. It is possible to effectively reduce a misalignment of structures of the fifth lens and the sixth lens, making lights in an edge field of view smoother and facilitating stable processing and productions for products, by satisfying the value of sd61/sd52 no more than 1.3.

According to a second aspect, a lens module is provided. The lens module includes a lens barrel, a photosensitive element, and the optical system of any implementations of the first aspect. A plurality of lenses of the optical system, from the first lens to the seventh lens, are installed within the lens barrel. The photosensitive element is disposed at the image side of the optical system. By installing the optical system provided in this disclosure within the lens module, the lens module can have a large optical aperture and thus a larger amount of light can enter the lens module, improving a photographing effect at dark conditions and resulting in a better imaging effect.

According to a third aspect, an electronic device is provided. The electronic device includes a housing and the lens module of the second aspect. The lens module is disposed within the housing. By installing the lens module provided in this disclosure within the electronic device, the optical system can have a large optical aperture and thus a larger amount of light can enter the optical system, improving a photographing effect of the electronic device at dark conditions, so that the electronic device can have a better imaging effect.

BRIEF DESCRIPTION OF THE DRAWINGS

In order to describe technical solutions of implementations more clearly, the following will give a brief introduction to the accompanying drawings used for describing implementations or the related art. Apparently, the accompanying drawings hereinafter described are some implementations of the disclosure. Based on these drawings, those of ordinary skill in the art can also obtain other drawings without creative effort.

FIG. 1b illustrates a longitudinal spherical aberration curve, an astigmatic curve, and a distortion curve of the optical system of FIG. 1a.

FIG. 2b illustrates a longitudinal spherical aberration curve, an astigmatic curve, and a distortion curve of the optical system of FIG. 2a.

FIG. 3b illustrates a longitudinal spherical aberration curve, an astigmatic curve, and a distortion curve of the optical system of FIG. 3a.

FIG. 4b illustrates a longitudinal spherical aberration curve, an astigmatic curve, and a distortion curve of the optical system of FIG. 4a.

FIG. 5b illustrates a longitudinal spherical aberration curve, an astigmatic curve, and a distortion curve of the optical system of FIG. 5a.

FIG. 6b illustrates a longitudinal spherical aberration curve, an astigmatic curve, and a distortion curve of the optical system of FIG. 6a.

FIG. 7b illustrates a longitudinal spherical aberration curve, an astigmatic curve, and a distortion curve of the optical system of FIG. 7a.

FIG. 8b illustrates a longitudinal spherical aberration curve, an astigmatic curve, and a distortion curve of the optical system of FIG. 8a.

FIG. 9b illustrates a longitudinal spherical aberration curve, an astigmatic curve, and a distortion curve of the optical system of FIG. 9a.

FIG. 10b illustrates a longitudinal spherical aberration curve, an astigmatic curve, and a distortion curve of the optical system of FIG. 10a.

DETAILED DESCRIPTION

Figure 1A:
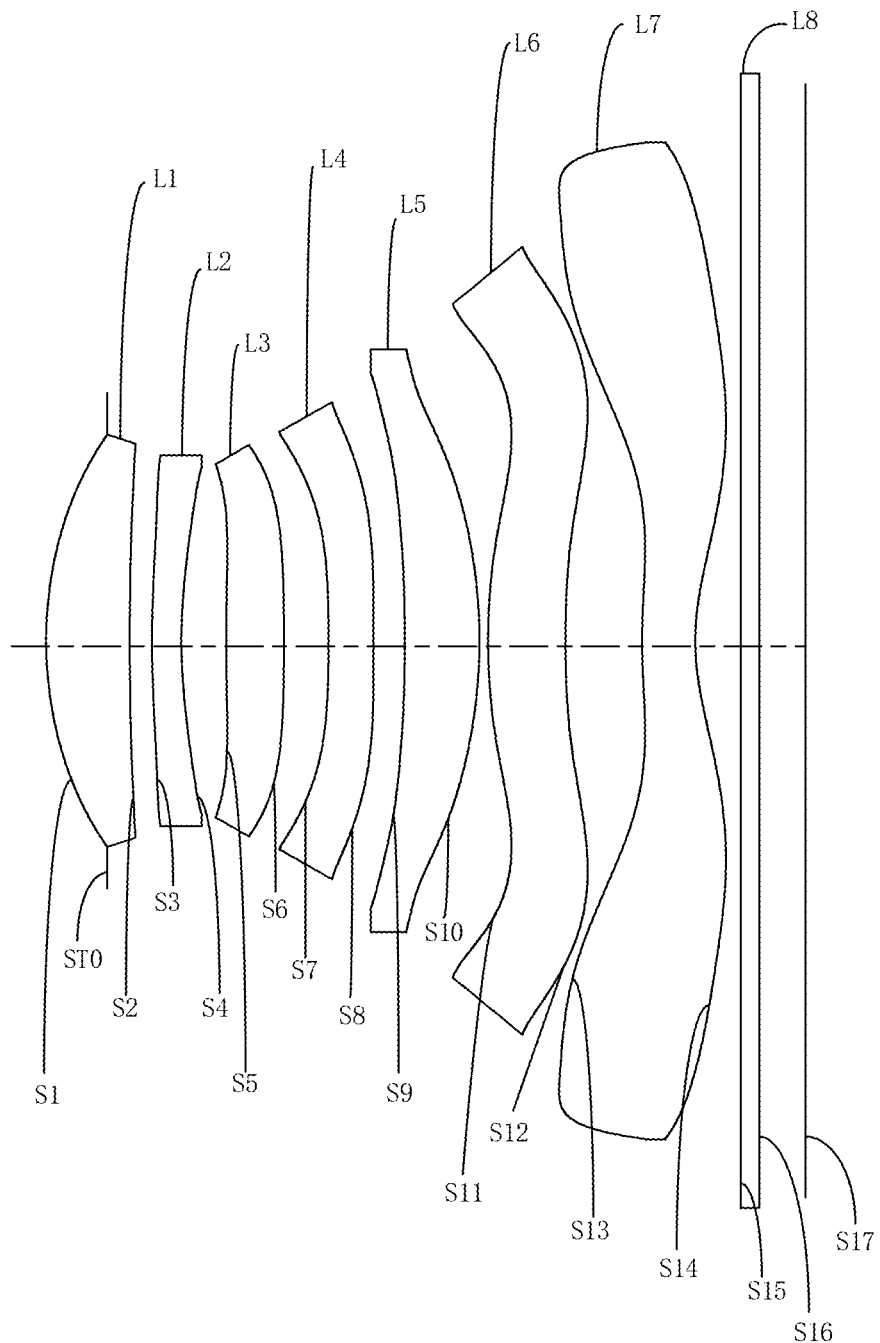
FIG. 1a is a schematic structural diagram of an optical system according to an embodiment of the disclosure.

The following will clearly and completely describe technical solutions of implementations with reference to the accompanying drawings. Apparently, implementations described herein are merely some rather than all implementations of the disclosure. Based on the implementations described herein, all other implementations obtained by those of ordinary skill in the art without creative effort shall fall within the protection scope of the disclosure.

In this disclosure, an electronic device is provided. The electronic device includes a housing and a lens module provided in this disclosure. The lens module is disposed within the housing. The electronic device may be a smart phone, a personal digital assistant (PDA), a tablet computer, a smart watch, an unmanned aerial vehicle, an electronic book viewer, a drive recorder, a wearable device, and the like. By installing the lens module provided in this disclosure within the electronic device, the optical system can have a large optical aperture and thus a larger amount of light can enter the optical system, improving a photographing effect of the electronic device at dark conditions, so that the electronic device can have a better imaging effect.

In this disclosure, a lens module is provided. The lens module includes a lens barrel, a photosensitive element, and the optical system provided in this disclosure. A plurality of lenses of the optical system, from the first lens to the seventh lens, are installed within the lens barrel. The photosensitive element disposed at an image side of the optical system is configured to convert a ray, which goes through from the first lens to the seventh lens and is incident on the photosensitive element, into an electrical signal of an image. The photosensitive element may be a complementary metal oxide semiconductor (CMOS) or a charge-coupled device (CCD). The lens module may be an independent camera of a digital camera, or an imaging module integrated on the electronic device such as a smart phone. By installing the optical system provided in this disclosure within the lens module, the lens module can have a large optical aperture and thus a larger amount of light can enter the lens module, improving a photographing effect at dark conditions and resulting in a better imaging effect.

In this disclosure, an optical system is provided. The optical system includes, in order from an object side to an image side, a first lens with a positive refractive power, a second lens with a refractive power, a third lens with a refractive power, a fourth lens with a refractive power, a fifth lens with a refractive power, a sixth lens with a refractive power, and a seventh lens with a negative refractive power. The first lens has an object-side surface which is convex at an optical axis and an image-side surface which is concave at the optical axis and at a circumference. The second lens has an object-side surface which is convex at the optical axis and an image-side surface which is concave at the optical axis and at a circumference. The seventh lens has an image-side surface, which is concave at the optical axis and has at least one inflection point. The optical system satisfies the following expression f/EPD<1.7, where f represents an effective focal length of the optical system, and EPD represents an entrance diameter of the optical system. As such, the optical system can have a large optical aperture and thus a larger amount of light may enter the optical system, improving a photographing effect at dark conditions and resulting in a better imaging effect, by appropriately configuring refractive powers and surface profiles from the first lens to the seventh lens and simultaneously satisfying the value of f/EPD less than 1.7. For example, the value of f/EPD may be 1.7, 1.4, 1.1, 0.7, 0.5, or 0.1.

In an implementation, the optical system satisfies the expression TTL/Imgh<1.7, where TTL represents a distance on the optical axis from the object-side surface of the first lens to an imaging surface of the optical system, and Imgh represents half of a diagonal length of an effective photosensitive area on the imaging surface of the optical system. As such, the optical system can have an ultra-thin characteristic, realizing a compact size of the optical system, by satisfying the value of TTL/Imgh less than 1.7. For example, the value of TTL/Imgh may be 1.7, 1.5, 1.2, 0.5, 0.3, or 0.1.

In an implementation, the optical system satisfies the expression f*tan(HFOV)>5.15 mm, where HFOV represents half of an angle of view of the optical system. As such, the optical system can have a great image plane and thus have a characteristic of high resolution and high definition, by satisfying the value of f*tan(HFOV) greater than 5.15 mm. For example, the value of f*tan(HFOV) may be 5.15 mm, 5.18 mm, 5.2 mm, 5.5 mm, 6 mm, 8 mm, or 10 mm.

In an implementation, the optical system satisfies the expression 1<TTL/f<1.5, where TTL represents a distance on the optical axis from the object-side surface of the first lens to an imaging surface of the optical system. By configuring the value of TTL/f between 1 and 1.5, a ratio of a total length to a focal length can be controlled to be less than 1.5, so that the optical system can have a characteristic of the compact size; at the same time, the ratio can be controlled to be greater than 1, so that a sensitivity of the optical system can be weaken, which facilitates processing and production for products. For example, the value of TTL/f may be 1, 1.1, 1.2, 1.3, 1.4, or 1.5.

In an implementation, the optical system satisfies the expression 0.5<|R5/R6|<1.5, where R5 represents a radius of curvature of an object-side surface of the third lens at the optical axis, and R6 represents a radius of curvature of an image-side surface of the third lens at the optical axis. It is possible to facilitate processing for the third lens and effectively reduce the sensitivity of the optical system at the third lens, by satisfying the value of |R5/R6| between 0.5 and 1.5. For example, the value of |R5/R6| may be 0.5, 0.7, 0.8, 0.9, 1, 1.1, 1.2, 1.3, 1.4, or 1.5.

In an implementation, the optical system satisfies the expression 0.5<TTH2/CT3<1.5, where TTH2 represents an air spacing distance on the optical axis from the second lens to the third lens, and CT3 represents a thickness of the third lens on the optical axis. It is possible to effectively reduce a sensitivity of the optical system and facilitate processing and productions for products, by satisfying the value of TTH2/CT3 between 0.5 and 1.5. For example, the value of TTH2/CT3 may be 0.5, 0.6, 0.7, 0.8, 0.9, 1, 1.1, 1.2, 1.3, 1.4, or 1.5.

In an implementation, the optical system satisfies the expression |f1/f5|<2, where f1 represents an effective focal length of the first lens, and f5 represents an effective focal length of the fifth lens. It is possible to reasonably control distributions of optical effective focal lengths of the first lens and the fifth lens, and effectively correct a longitudinal chromatic aberration of the optical system, by satisfying the value of |f1/f5| less than 2. For example, the value of TTH2/CT3 may be 0.1, 0.4, 0.7, 1, 1.4, 1.8, or 2.

In an implementation, the optical system satisfies the expression 0.2<ET2/CT2<1.3, where ET2 represents a thickness of an edge of an optical effective area of the second lens, and CT2 represents a thickness of the second lens on the optical axis. It is possible to control a ratio of an edge thickness of the second lens to a center thickness of the second lens within a suitable range, and facilitate processing and productions for the second lens, by satisfying the value of ET2/CT2 between 0.2 and 1.3. For example, the value of ET2/CT2 may be 0.2, 0.5, 0.7, 1, 1.1, or 1.3.

In an implementation, the optical system satisfies the expression TTL/f1 ≤ 1.5, where TTL represents a distance on the optical axis from the object-side surface of the first lens to an imaging surface of the optical system, and f1 represents an effective focal length of the first lens. It is possible to reasonably control a refractive power of the first lens for avoiding excessive increase of the refractive power of the first lens and guaranteeing a relatively short total length of the optical system, by satisfying the value of TTL/f1 within 1.5. For example, the value of TTL/f1 may be 1.5, 1.2, 1, 0.8, 0.5, 0.3, or 0.1.

In an implementation, the optical system satisfies the expression EPD/R1<1.5, where R1 represents a radius of curvature of the object-side surface of the first lens at the optical axis. It is possible to effectively guarantee a rationality of an incident light deflecting at the first lens, by satisfying the value of EPD/R1 less than 1.5. For example, the value of EPD/R1 may be 1.5, 1.2, 1, 0.8, 0.5, 0.3, or 0.1.

In an implementation, the optical system satisfies the expression sd61/sd52 ≤ 1.3, where sd61 represents a clear aperture of an object-side surface of the sixth lens at a maximum angle of view, and sd52 represents a clear aperture of an image-side surface of the fifth lens at the maximum angle of view. It is possible to effectively reduce a misalignment of structures of the fifth lens and the sixth lens, making lights in an edge field of view smoother and facilitating stable processing and productions for products, by satisfying the value of sd61/sd52 within 1.3. For example, the value of sd61/sd52 may be 1.2, 1, 0.8, 0.5, 0.3, or 0.1.

Figure 1B:
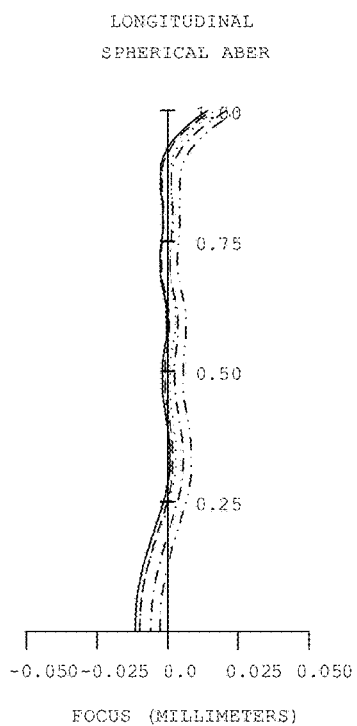
Figure 1B:
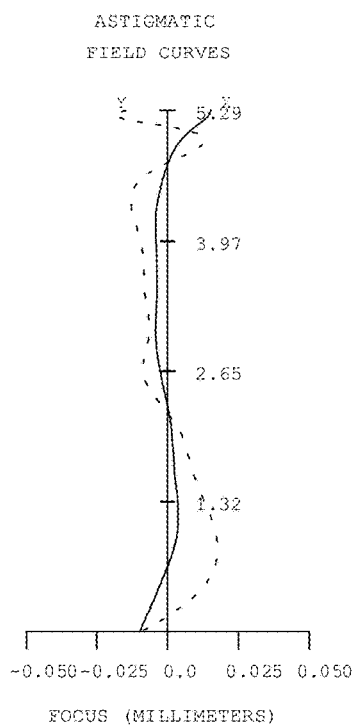
Figure 1B:
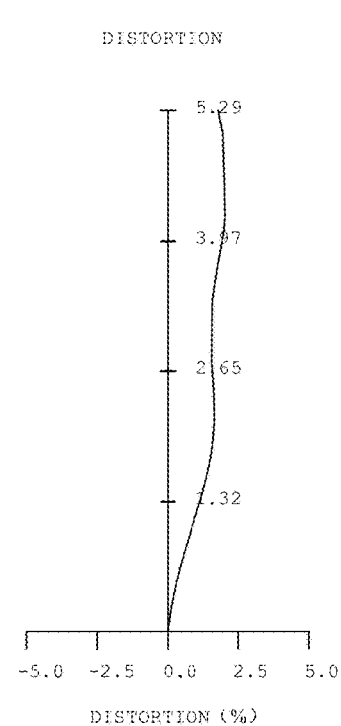

Referring to FIG. 1a and FIG. 1b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a negative refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is concave at the optical axis and convex at the circumference.

The fifth lens L5 with a positive refractive power has an object-side surface S9 which is concave at an optical axis and at a circumference, and has an image-side surface S10 which is convex at the optical axis and at the circumference.

The sixth lens L6 with a positive refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

The above-mentioned lenses, from the first lens L1 to the seventh lens L7 are made of plastic.

The optical system further includes a stop STO, an infrared cut filter L8, and an imaging surface S17. The stop STO disposed at the object-side surface S1 of the first lens L1 is configured to control the amount of light entering the optical system. In other implementations, the stop STO can also be disposed between two adjacent lenses, or on other lenses. The infrared cut filter L8 is disposed at an image side of the seventh lens L7 and includes an object-side surface S15 and an image-side surface S16. The infrared cut filter L8 is configured to filter out infrared light, so that light incident onto the imaging surface S17 is visible light. The visible light has a wavelength ranging from 380 nanometers (nm) to 780 nm. The infrared cut filter L8 is made of glass and can be coated on the glass. The imaging surface S17 is an effective pixel area of the photosensitive element.

Table 1a illustrates characteristics of the optical system in this embodiment, where data is obtained by using light with a wavelength of 555 nm. The Y radius, the thickness, and the focal length are measured in millimeters (mm).

TABLE 1a

Embodiment of FIG. 1a
f = 6.51 mm, FNO = 1.66, FOV = 77.14 deg, TTL = 8.6 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | −0.6930 | | | | |
| S1 | First | aspheric | 3.2285 | 0.9450 | plastic | 1.55 | 56.11 | 6.83 |
| S2 | lens | aspheric | 21.5417 | 0.2530 | | | | |
| S3 | Second | aspheric | 7.8788 | 0.3339 | plastic | 1.67 | 20.37 | −15.10 |
| S4 | lens | aspheric | 4.3456 | 0.5091 | | | | |
| S5 | Third | aspheric | 17.6363 | 0.6510 | plastic | 1.54 | 55.75 | 20.50 |
| S6 | lens | aspheric | −28.8702 | 0.5069 | | | | |
| S7 | Fourth | aspheric | −16.1644 | 0.5093 | plastic | 1.67 | 20.37 | −18.28 |
| S8 | lens | aspheric | 50.2328 | 0.3536 | | | | |
| S9 | Fifth | aspheric | −23.4819 | 0.8459 | plastic | 1.55 | 56.11 | 9.48 |
| S10 | lens | aspheric | −4.2952 | 0.1000 | | | | |
| S11 | Sixth | aspheric | 6.0551 | 0.8763 | plastic | 1.54 | 55.75 | 21.78 |
| S12 | lens | aspheric | 11.9260 | 0.8675 | | | | |
| S13 | Seventh | aspheric | 5.3968 | 0.6000 | plastic | 1.54 | 55.75 | −5.76 |
| S14 | lens | aspheric | 1.8885 | 0.5160 | | | | |
| S15 | Infrared | spheric | Infinity | 0.2100 | glass | | | |
| S16 | cut filter | spheric | Infinity | 0.5224 | | | | |
| S17 | Imaging surface | spheric | Infinity | 0.0000 | | | | |

Note:
a reference wavelength is 555 nm

In Table 1a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

In this embodiment, the object-side surface and the image-side surface of any one lens from the first lens L1 to the seventh lens L7 are aspheric. A surface profile x of each of the aspheric lenses can be limited by using, but not limit to the following equation:

$$x = \frac{ch^2}{1\sqrt{1-(k+1)c^2h^2}} + \sum Aih^i$$

In this equation, x represents a maximum sagittal depth from a vertex on the aspheric surface to a position of height h on the aspheric surface along the optical axis, c represents a radius of curvature the aspheric surface near the optical axis, c=1/R (that is, the radius of curvature near the optical axis c is a reciprocal of the Y radius R in the above Table 1a), k represents a conic coefficient, Ai represents a correction coefficient of order i of the aspheric surface. Table 1b shows high-order coefficients A4, A6, A8, A10, A12, A14, A16, A18, and A20, which can be used in each of aspheric lens surfaces S1-S14 in this embodiment.

TABLE 1b

Embodiment of FIG. 1a
Aspheric coefficients

| Surface number | S1 | S2 | S3 | S4 | S5 | S6 | S7 |
|---|---|---|---|---|---|---|---|
| K | −3.12E+00 | −1.05E+01 | −2.16E+01 | −7.93E+00 | −3.32E+01 | 7.50E+01 | 6.10E+01 |
| A4 | 1.33E−02 | −6.53E−03 | −2.58E−02 | −1.90E−02 | −1.82E−02 | −2.22E−02 | −5.84E−02 |
| A6 | −3.12E−03 | 4.85E−03 | 1.24E−02 | 1.23E−02 | 7.52E−03 | 2.26E−03 | 4.39E−02 |
| A8 | 4.62E−03 | −3.03E−03 | −5.04E−03 | −1.08E−02 | −1.99E−02 | −4.88E−04 | −4.39E−02 |
| A10 | −4.45E−03 | 2.45E−03 | 3.11E−03 | 1.11E−02 | 2.15E−02 | −6.25E−03 | 3.03E−02 |
| A12 | 2.71E−03 | −1.80E−03 | −2.46E−03 | −8.03E−03 | −1.42E−02 | 7.53E−03 | −1.47E−02 |
| A14 | −1.03E−03 | 8.75E−04 | 1.42E−03 | 3.41E−03 | 5.37E−03 | −4.29E−03 | 5.12E−03 |
| A16 | 2.35E−04 | −2.53E−04 | −4.84E−04 | −7.00E−04 | −9.97E−04 | 1.37E−03 | −1.17E−03 |
| A18 | −2.99E−05 | 3.94E−05 | 8.83E−05 | 2.86E−05 | 3.23E−05 | −2.37E−04 | 1.51E−04 |
| A20 | 1.61E−06 | −2.54E−06 | −6.59E−06 | 7.79E−06 | 1.05E−05 | 1.72E−05 | −8.16E−06 |

| Surface number | S8 | S9 | S10 | S11 | S12 | S13 | S14 |
|---|---|---|---|---|---|---|---|
| K | −9.80E+01 | 6.22E+01 | −7.98E−01 | −1.41E+01 | 8.09E+00 | −5.49E+01 | −5.33E+00 |
| A4 | −7.76E−02 | −5.98E−02 | −8.53E−03 | 4.11E−02 | 3.90E−02 | −4.36E−02 | −3.10E−02 |
| A6 | 6.69E−02 | 6.87E−02 | 1.02E−02 | −2.38E−02 | −1.86E−02 | 3.12E−03 | 5.86E−03 |
| A8 | −4.85E−02 | −4.13E−02 | −6.25E−03 | 6.94E−03 | 4.29E−03 | 9.06E−04 | −8.97E−04 |
| A10 | 2.28E−02 | 1.46E−02 | 2.13E−03 | −1.55E−03 | −7.12E−04 | −2.45E−04 | 1.02E−04 |
| A12 | −7.21E−03 | −3.36E−03 | −5.09E−04 | 2.45E−04 | 8.59E−05 | 2.91E−05 | −7.52E−06 |
| A14 | 1.60E−03 | 5.28E−04 | 8.74E−05 | −2.46E−05 | −7.23E−06 | −2.03E−06 | 3.39E−07 |
| A16 | −2.41E−04 | −5.61E−05 | −9.51E−06 | 1.36E−06 | 3.97E−07 | 8.56E−08 | −8.74E−09 |
| A18 | 2.20E−05 | 3.69E−06 | 5.58E−07 | −3.09E−08 | −1.27E−08 | −2.02E−09 | 1.11E−10 |
| A20 | −8.90E−07 | −1.14E−07 | −1.32E−08 | −4.15E−11 | 1.79E−10 | 2.06E−11 | −4.53E−13 |

FIG. 1b illustrates a longitudinal spherical aberration curve, an astigmatic curve, and a distortion curve of the optical system of FIG. 1a. The reference wavelength of light of the astigmatic curve and the distortion curve is 555 nm. The longitudinal spherical aberration curve shows focus deviation of lights of different wavelengths after passing through lenses in the optical system, the astigmatic field curve represents a sagittal and tangential field curvature, and the distortion curve represents distortion values corresponding to different angles of view. The optical system in this embodiment has high imaging quality according to the FIG. 1b.

Figure 2A:
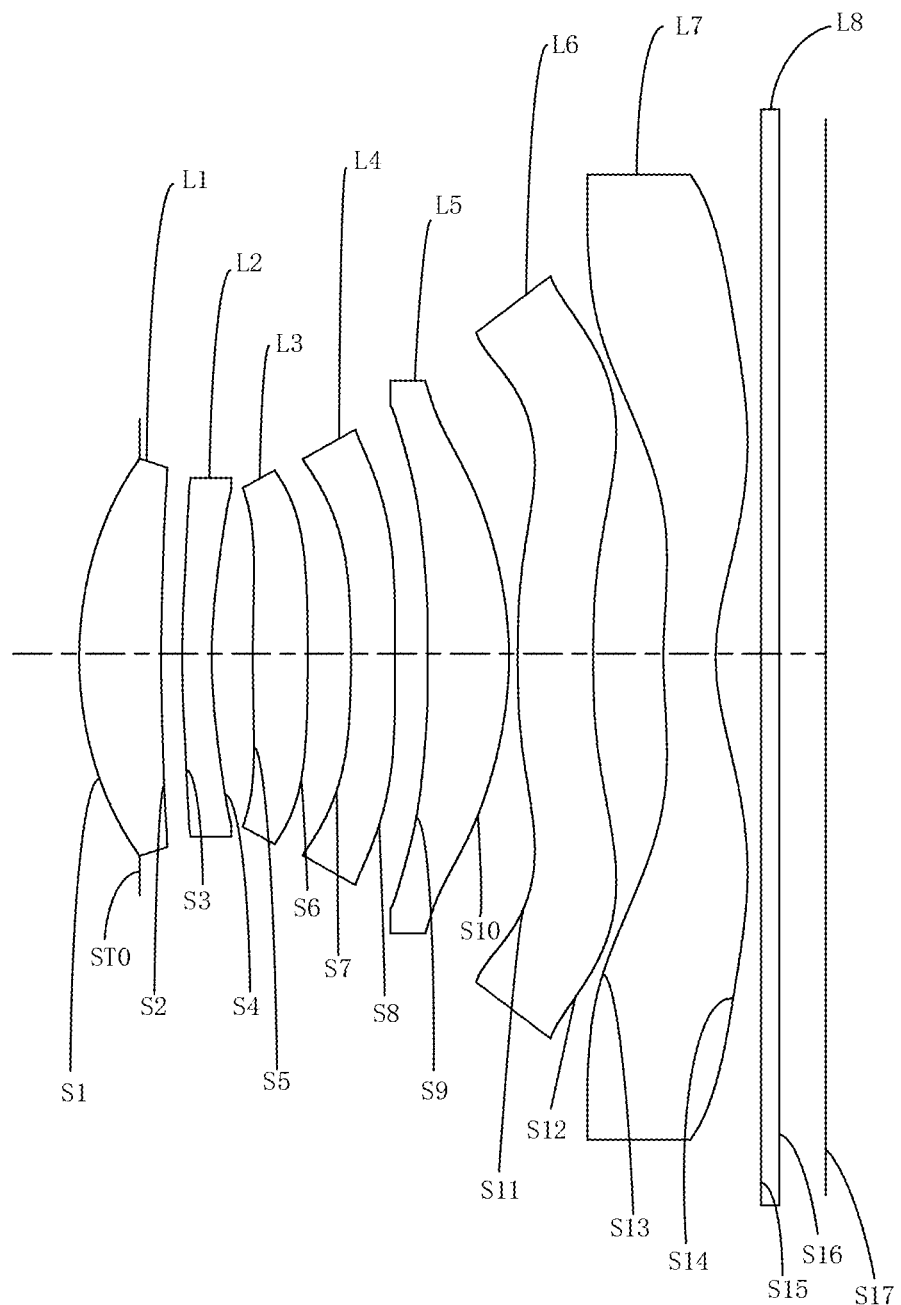
FIG. 2a is a schematic structural diagram of an optical system according to an embodiment of the disclosure.
Figure 2B:
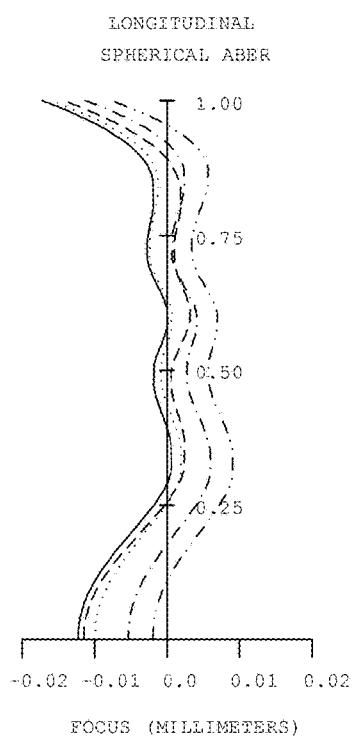
Figure 2B:
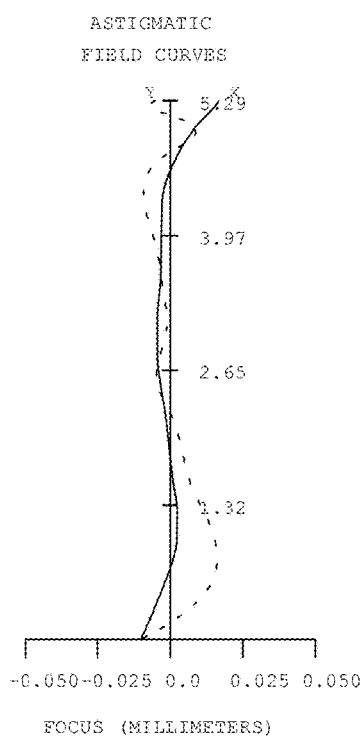
Figure 2B:
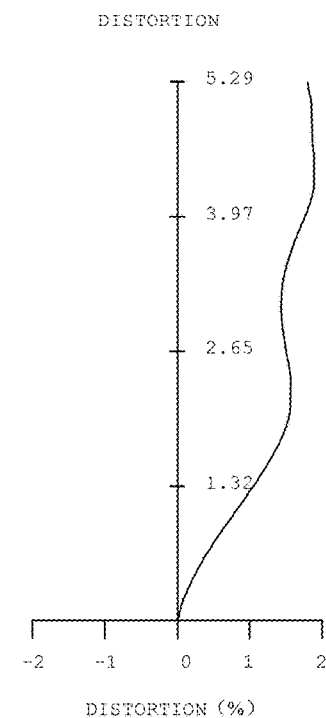

Referring to FIG. 2a and FIG. 2b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7. The first lens L1 with a positive refractive power has an object-side surface S1 which is convex at an optical axis and at a circumference, and has an image-side surface S2 which is concave at the optical axis and at the circumference.

The second lens L2 with a negative refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is concave at the optical axis and convex at the circumference.

The fifth lens L5 with a positive refractive power has an object-side surface S9 which is concave at an optical axis and at a circumference, and has an image-side surface S10 which is convex at the optical axis and at the circumference.

The sixth lens L6 with a negative refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 2a illustrates characteristics of the optical system in this embodiment, where data is obtained by using light with a wavelength of 555 nm. The Y radius, the thickness, and the focal length are measured in mm.

TABLE 2a

Embodiment of FIG. 2a
f = 6.50 mm, FNO = 1.66, FOV = 77.27 deg, TTL = 8.6 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | −0.6969 | | | | |
| S1 | First | aspheric | 3.1958 | 0.9450 | plastic | 1.55 | 56.11 | 6.88 |
| S2 | lens | aspheric | 19.2147 | 0.2395 | | | | |
| S3 | Second | aspheric | 7.7410 | 0.3417 | plastic | 1.67 | 20.37 | −15.52 |
| S4 | lens | aspheric | 4.3507 | 0.4743 | | | | |
| S5 | Third | aspheric | 16.6984 | 0.6306 | plastic | 1.54 | 55.75 | 20.17 |
| S6 | lens | aspheric | −30.3682 | 0.4987 | | | | |
| S7 | Fourth | aspheric | −15.8422 | 0.5082 | plastic | 1.67 | 20.37 | −18.78 |
| S8 | lens | aspheric | 60.7049 | 0.3796 | | | | |
| S9 | Fifth | aspheric | −21.2331 | 0.9333 | plastic | 1.55 | 56.11 | 6.80 |
| S10 | lens | aspheric | −3.2078 | 0.1000 | | | | |
| S11 | Sixth | aspheric | 11.6728 | 0.8704 | plastic | 1.54 | 55.75 | −999986.63 |
| S12 | lens | aspheric | 11.3685 | 0.8116 | | | | |
| S13 | Seventh | aspheric | 4.9836 | 0.6000 | plastic | 1.54 | 55.75 | −5.87 |
| S14 | lens | aspheric | 1.8496 | 0.5253 | | | | |
| S15 | Infrared | spheric | Infinity | 0.2100 | glass | | | |
| S16 | cut filter | spheric | Infinity | 0.5318 | | | | |
| S17 | Imaging surface | spheric | Infinity | 0.0000 | | | | |

Note:
a reference wavelength is 555 nm

In Table 2a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 2b shows high-order coefficients used in each of aspheric lens surfaces in this embodiment, where the aspheric surface profile is limited by the equation in the embodiment of FIG. 1a.

TABLE 2b

Embodiment of FIG. 2a
Aspheric coefficients

| Surface number | S1 | S2 | S3 | S4 | S5 | S6 | S7 |
|---|---|---|---|---|---|---|---|
| K | −3.07E+00 | −2.46E+01 | −2.12E+01 | −8.03E+00 | −3.88E+01 | 9.80E+01 | 6.02E+01 |
| A4 | 1.35E−02 | −7.18E−03 | −2.58E−02 | −1.80E−02 | −1.65E−02 | −2.15E−02 | −5.50E−02 |
| A6 | −2.89E−03 | 5.02E−03 | 1.09E−02 | 7.48E−03 | 6.58E−04 | 1.96E−03 | 4.27E−02 |
| A8 | 4.43E−03 | −2.50E−03 | −1.04E−03 | 7.27E−03 | −4.22E−03 | −1.88E−03 | −4.86E−02 |
| A10 | −4.44E−03 | 1.50E−03 | −2.50E−03 | −5.83E−03 | −8.74E−04 | −4.05E−03 | 3.76E−02 |
| A12 | 2.81E−03 | −9.84E−04 | 2.26E−03 | 7.38E−03 | 5.85E−03 | 5.93E−03 | −2.04E−02 |
| A14 | −1.11E−03 | 4.64E−04 | −1.02E−03 | −5.39E−03 | −5.92E−03 | −3.64E−03 | 7.71E−03 |
| A16 | 2.63E−04 | −1.31E−04 | 2.71E−04 | 2.36E−03 | 2.91E−03 | 1.23E−03 | −1.87E−03 |
| A18 | −3.44E−05 | 1.95E−05 | −4.06E−05 | −5.64E−04 | −7.24E−04 | −2.22E−04 | 2.55E−04 |
| A20 | 1.92E−06 | −1.17E−06 | 2.74E−06 | 5.70E−05 | 7.34E−05 | 1.70E−05 | −1.46E−05 |

| Surface number | S8 | S9 | S10 | S11 | S12 | S13 | S14 |
|---|---|---|---|---|---|---|---|
| K | −5.14E+01 | 6.77E+01 | −1.48E+00 | −5.10E+00 | 7.57E+00 | −4.42E+01 | −5.14E+00 |
| A4 | −6.89E−02 | −5.66E−02 | 5.51E−03 | 5.14E−02 | 4.00E−02 | −3.95E−02 | −3.07E−02 |
| A6 | 5.80E−02 | 5.82E−02 | −1.11E−03 | −3.04E−02 | −1.88E−02 | 2.79E−03 | 6.05E−03 |
| A8 | −4.42E−02 | −3.27E−02 | −1.26E−04 | 9.55E−03 | 4.26E−03 | 8.80E−04 | −9.81E−04 |
| A10 | 2.21E−02 | 1.07E−02 | −2.63E−04 | −2.31E−03 | −6.93E−04 | −2.60E−04 | 1.14E−04 |
| A12 | −7.61E−03 | −2.26E−03 | 1.59E−04 | 4.05E−04 | 8.18E−05 | 3.42E−05 | −8.34E−06 |
| A14 | 1.86E−03 | 3.31E−04 | −4.06E−05 | −4.68E−05 | −6.81E−06 | −2.61E−06 | 3.72E−07 |
| A16 | −3.07E−04 | −3.50E−05 | 6.37E−06 | 3.25E−06 | 3.75E−07 | 1.18E−07 | −9.56E−09 |
| A18 | 3.04E−05 | 2.48E−06 | −5.72E−07 | −1.17E−07 | −1.20E−08 | −2.96E−09 | 1.26E−10 |
| A20 | −1.32E−06 | −8.66E−08 | 2.14E−08 | 1.60E−09 | 1.69E−10 | 3.16E−11 | −6.14E−13 |

FIG. 2b illustrates a longitudinal spherical aberration curve, an astigmatic curve, and a distortion curve of the optical system of FIG. 2a. The reference wavelength of light of the astigmatic curve and the distortion curve is 555 nm. The optical system in this embodiment has high imaging quality according to the FIG. 2b.

Figure 3A:
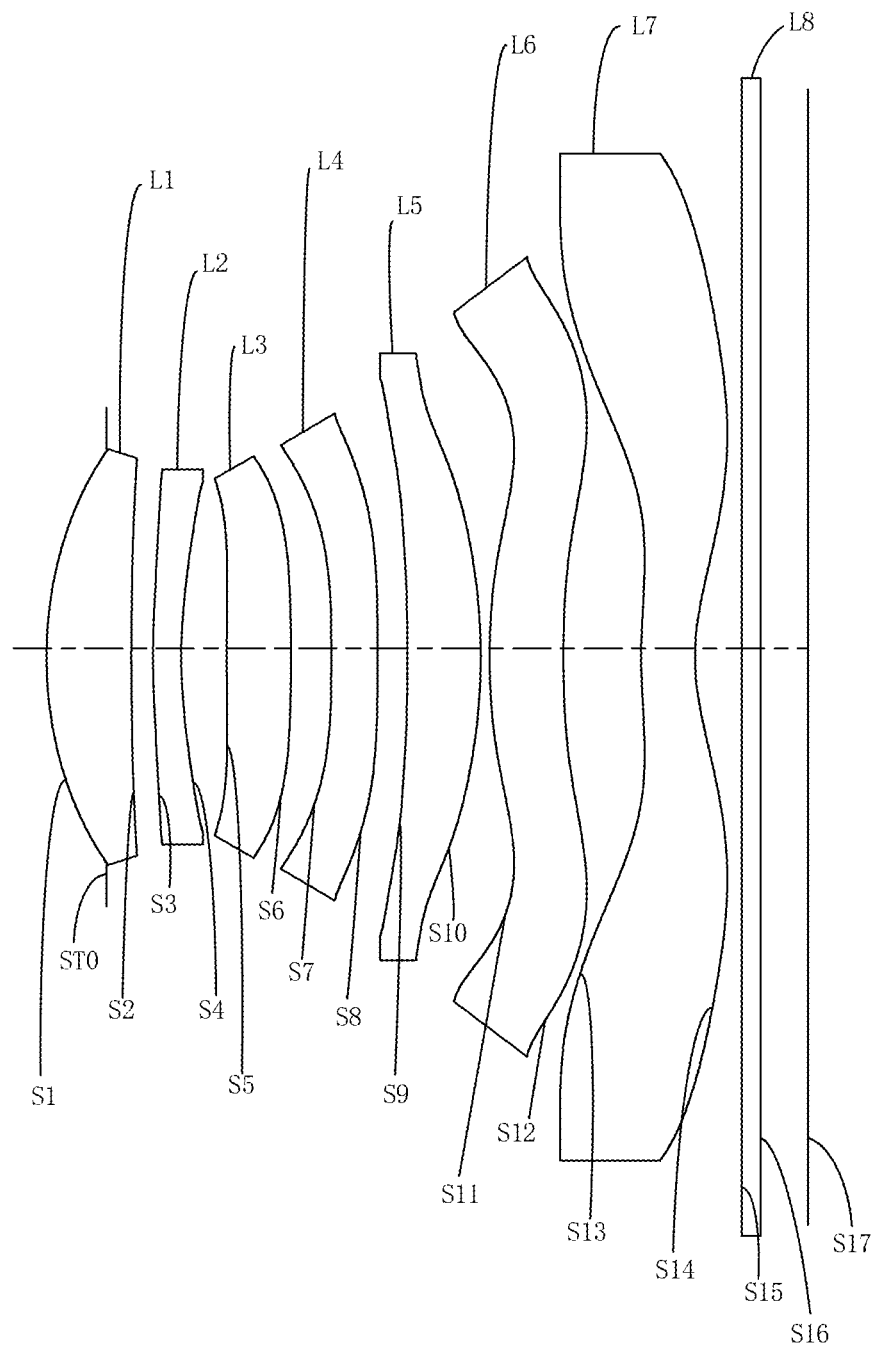
FIG. 3a is a schematic structural diagram of an optical system according to an embodiment of the disclosure.
Figure 3B:
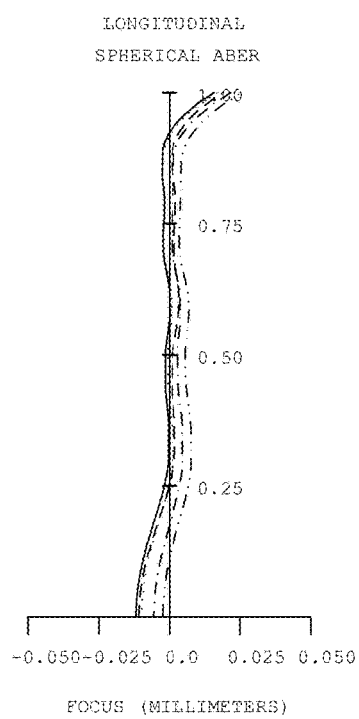
Figure 3B:
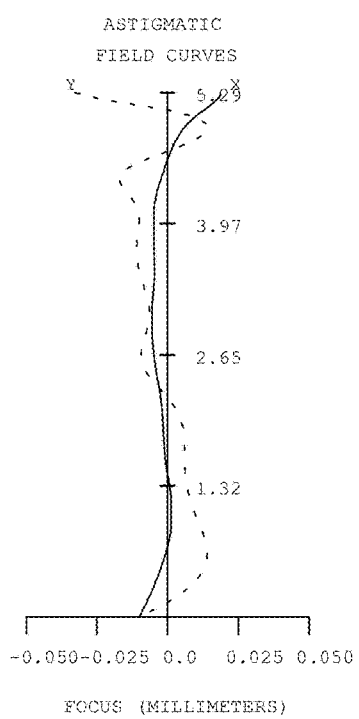
Figure 3B:
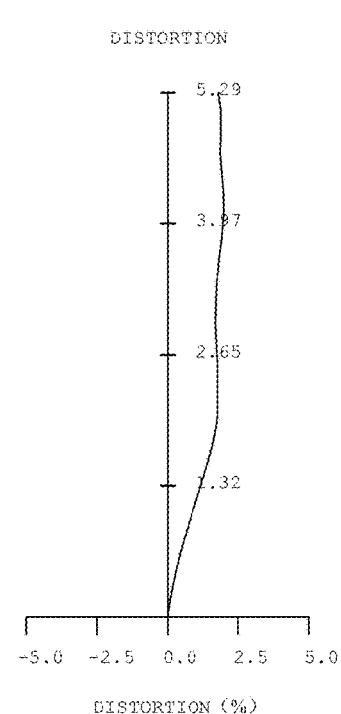

Referring to FIG. 3a and FIG. 3b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a negative refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is concave at the optical axis and convex at the circumference.

The fifth lens L5 with a positive refractive power has an object-side surface S9 which is concave at an optical axis and at a circumference, and has an image-side surface S10 which is convex at the optical axis and at the circumference.

The sixth lens L6 with a positive refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 3a illustrates characteristics of the optical system in this embodiment, where data is obtained by using light with a wavelength of 555 nm. The Y radius, the thickness, and the focal length are measured in mm.

TABLE 3a

Embodiment of FIG. 3a
f = 6.43 mm, FNO = 1.66, FOV = 77.8 deg, TTL = 8.5 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | −0.6693 | | | | |
| S1 | First lens | aspheric | 3.1816 | 0.9450 | plastic | 1.55 | 56.11 | 6.71 |
| S2 | | aspheric | 21.6765 | 0.2434 | | | | |
| S3 | Second lens | aspheric | 6.8169 | 0.3158 | plastic | 1.67 | 20.37 | −14.95 |
| S4 | | aspheric | 3.9741 | 0.5052 | | | | |
| S5 | Third lens | aspheric | 25.3380 | 0.7192 | plastic | 1.54 | 55.75 | 21.17 |
| S6 | | aspheric | −20.4012 | 0.4526 | | | | |
| S7 | Fourth lens | aspheric | −16.0012 | 0.5113 | plastic | 1.67 | 20.37 | −18.49 |
| S8 | | aspheric | 54.5748 | 0.3364 | | | | |
| S9 | Fifth lens | aspheric | −37.8944 | 0.8181 | plastic | 1.55 | 56.11 | 9.93 |
| S10 | | aspheric | −4.7772 | 0.1000 | | | | |
| S11 | Sixth lens | aspheric | 5.7874 | 0.8255 | plastic | 1.54 | 55.75 | 20.45 |
| S12 | | aspheric | 11.6317 | 0.8664 | | | | |
| S13 | Seventh lens | aspheric | 4.5830 | 0.6000 | plastic | 1.54 | 55.75 | −5.87 |
| S14 | | aspheric | 1.7826 | 0.5228 | | | | |
| S15 | Infrared cut filter | spheric | Infinity | 0.2100 | glass | | | |
| S16 | | spheric | Infinity | 0.5285 | | | | |
| S17 | Imaging surface | spheric | Infinity | 0.0000 | | | | |

Note:
a reference wavelength is 555 nm

In Table 3a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 3b shows high-order coefficients used in each of aspheric lens surfaces in this embodiment, where the aspheric surface profile is limited by the equation in the embodiment of FIG. 1a.

TABLE 3b

Embodiment of FIG. 3a
Aspheric coefficients

| Surface number | S1 | S2 | S3 | S4 | S5 | S6 | S7 |
|---|---|---|---|---|---|---|---|
| K | −3.04E+00 | −2.07E+01 | −2.30E+01 | −8.03E+00 | −2.45E+01 | 5.92E+01 | 6.02E+01 |
| A4 | 1.34E−02 | −8.16E−03 | −2.96E−02 | −2.14E−02 | −1.90E−02 | −2.54E−02 | −6.26E−02 |

TABLE 3b-continued

Embodiment of FIG. 3a
Aspheric coefficients

| A6  | −2.59E−03 | 5.78E−03  | 1.57E−02  | 1.33E−02  | 7.25E−03  | 9.03E−03  | 4.82E−02  |
| A8  | 3.85E−03  | −2.43E−03 | −6.13E−03 | −8.08E−03 | −1.90E−02 | −1.12E−02 | −4.56E−02 |
| A10 | −3.73E−03 | 1.17E−03  | 2.90E−03  | 6.05E−03  | 2.09E−02  | 5.64E−03  | 2.89E−02  |
| A12 | 2.28E−03  | −8.62E−04 | −1.94E−03 | −3.45E−03 | −1.40E−02 | −8.83E−04 | −1.27E−02 |
| A14 | −8.57E−04 | 5.03E−04  | 1.10E−03  | 8.58E−04  | 5.36E−03  | −4.18E−04 | 4.21E−03  |
| A16 | 1.93E−04  | −1.71E−04 | −3.87E−04 | 1.70E−04  | −9.96E−04 | 2.56E−04  | −9.83E−04 |
| A18 | −2.37E−05 | 3.02E−05  | 7.33E−05  | −1.42E−04 | 2.22E−05  | −5.69E−05 | 1.36E−04  |
| A20 | 1.21E−06  | −2.15E−06 | −5.66E−06 | 2.27E−05  | 1.32E−05  | 4.91E−06  | −7.96E−06 |

| Surface number | S8 | S9 | S10 | S11 | S12 | S13 | S14 |
| --- | --- | --- | --- | --- | --- | --- | --- |
| K   | −7.43E+01 | 4.26E+01  | −8.94E−01 | −1.39E+01 | 8.32E+00  | −4.23E+01 | −5.35E+00 |
| A4  | −8.44E−02 | −6.60E−02 | −9.89E−03 | 4.40E−02  | 3.90E−02  | −4.77E−02 | −3.13E−02 |
| A6  | 7.68E−02  | 7.91E−02  | 1.31E−02  | −2.45E−02 | −1.68E−02 | 5.32E−03  | 6.19E−03  |
| A8  | −5.53E−02 | −4.77E−02 | −7.64E−03 | 6.91E−03  | 3.09E−03  | 1.67E−05  | −1.03E−03 |
| A10 | 2.47E−02  | 1.62E−02  | 2.33E−03  | −1.57E−03 | −3.54E−04 | −2.61E−05 | 1.27E−04  |
| A12 | −7.08E−03 | −3.34E−03 | −4.95E−04 | 2.60E−04  | 2.38E−05  | −2.12E−06 | −1.03E−05 |
| A14 | 1.37E−03  | 4.29E−04  | 8.37E−05  | −2.70E−05 | −4.64E−07 | 6.08E−07  | 5.19E−07  |
| A16 | −1.85E−04 | −3.35E−05 | −9.75E−06 | 1.52E−06  | −6.18E−08 | −4.53E−08 | −1.56E−08 |
| A18 | 1.60E−05  | 1.46E−06  | 6.31E−07  | −3.26E−08 | 4.96E−09  | 1.51E−09  | 2.53E−10  |
| A20 | −6.51E−07 | −2.73E−08 | −1.66E−08 | −1.62E−10 | −1.14E−10 | −1.95E−11 | −1.68E−12 |

FIG. 3b illustrates a longitudinal spherical aberration curve, an astigmatic curve, and a distortion curve of the optical system of FIG. 3a. The reference wavelength of light of the astigmatic curve and the distortion curve is 555 nm. The optical system in this embodiment has high imaging quality according to the FIG. 3b.

Figure 4A:
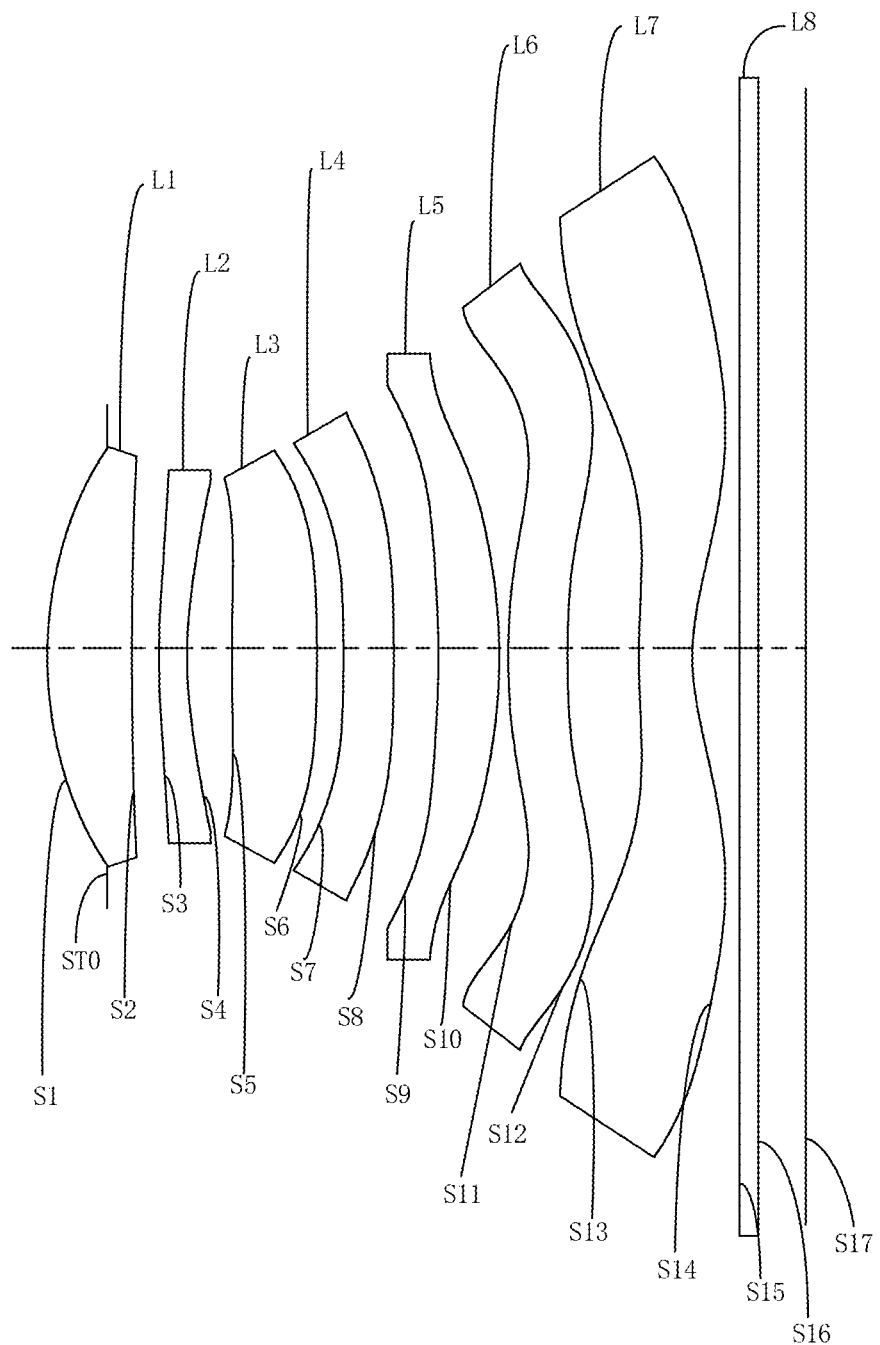
FIG. 4a is a schematic structural diagram of an optical system according to an embodiment of the disclosure.
Figure 4B:
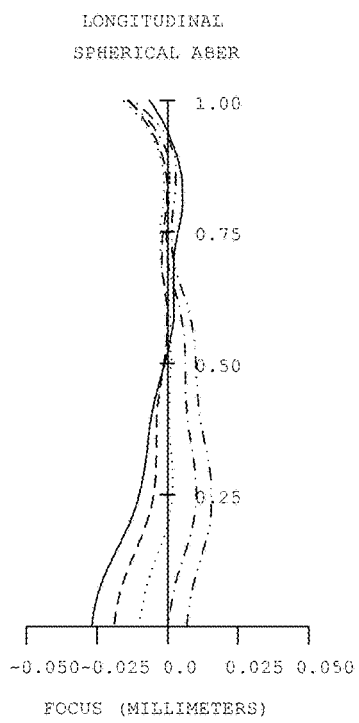
Figure 4B:
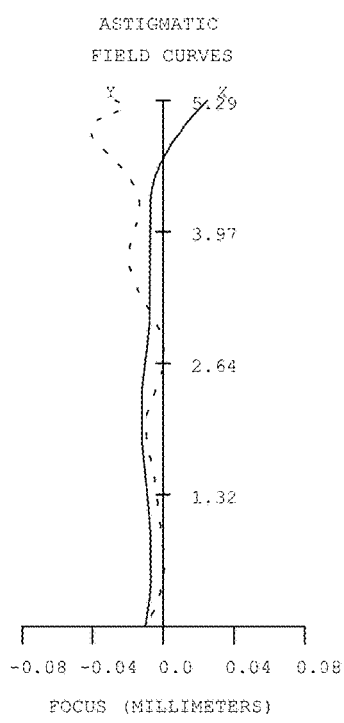
Figure 4B:
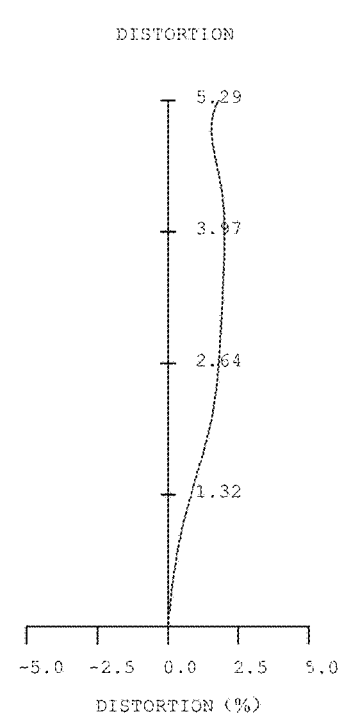

Referring to FIG. 4a and FIG. 4b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a negative refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a positive refractive power has an object-side surface S7 which is concave at an optical axis and at a circumference, and has an image-side surface S8 which is convex at the optical axis and at the circumference.

The fifth lens L5 with a positive refractive power has an object-side surface S9 which is concave at an optical axis and at a circumference, and has an image-side surface S10 which is convex at the optical axis and at the circumference.

The sixth lens L6 with a positive refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 4a illustrates characteristics of the optical system in this embodiment, where data is obtained by using light with a wavelength of 555 nm. The Y radius, the thickness, and the focal length are measured in mm.

TABLE 4a

Embodiment of FIG. 4a
f = 6.49 mm, FNO = 1.66, FOV = 77.3 deg, TTL = 8.47 mm

| Surface number | Surface name | Surface type | Y radius | Thickness | Material | Refractive index | Abbe number | Focal length |
| --- | --- | --- | --- | --- | --- | --- | --- | --- |
| Object surface |  | spheric | Infinity | Infinity |  |  |  |  |
| STO | Stop | spheric | Infinity | −0.6667 |  |  |  |  |
| S1 | First | aspheric | 3.2537 | 0.9450 | plastic | 1.55 | 56.11 | 6.60 |
| S2 | lens | aspheric | 29.9565 | 0.3000 |  |  |  |  |
| S3 | Second | aspheric | 5.5932 | 0.3150 | plastic | 1.67 | 20.37 | −13.05 |
| S4 | lens | aspheric | 3.3282 | 0.5014 |  |  |  |  |
| S5 | Third | aspheric | 19.4152 | 0.9479 | plastic | 1.54 | 55.75 | 19.80 |
| S6 | lens | aspheric | −23.0859 | 0.2991 |  |  |  |  |
| S7 | Fourth | aspheric | −17.4926 | 0.5625 | plastic | 1.67 | 20.37 | 999.99 |
| S8 | lens | aspheric | −17.2650 | 0.4964 |  |  |  |  |

TABLE 4a-continued

Embodiment of FIG. 4a
f = 6.49 mm, FNO = 1.66, FOV = 77.3 deg, TTL = 8.47 mm

| Surface number | Surface name | Surface type | Y radius | Thickness | Material | Refractive index | Abbe number | Focal length |
|---|---|---|---|---|---|---|---|---|
| S9 | Fifth | aspheric | −9.0043 | 0.6813 | plastic | 1.55 | 56.11 | 16.00 |
| S10 | lens | aspheric | −4.5526 | 0.1000 | | | | |
| S11 | Sixth | aspheric | 5.8886 | 0.6639 | plastic | 1.54 | 55.75 | 21.41 |
| S12 | lens | aspheric | 11.6039 | 0.7944 | | | | |
| S13 | Seventh | aspheric | 5.5543 | 0.6000 | plastic | 1.54 | 55.75 | −5.45 |
| S14 | lens | aspheric | 1.8436 | 0.5256 | | | | |
| S15 | Infrared | spheric | Infinity | 0.2100 | | | | |
| S16 | cut filter | spheric | Infinity | 0.5313 | glass | | | |
| S17 | Imaging surface | spheric | Infinity | 0.0000 | | | | |

Note:
a reference wavelength is 555 nm

In Table 4a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 4b shows high-order coefficients used in each of aspheric lens surfaces in this embodiment, where the aspheric surface profile is limited by the equation in the embodiment of FIG. 1a.

TABLE 4b

Embodiment of FIG. 4a
Aspheric coefficients

| Surface number | S1 | S2 | S3 | S4 | S5 | S6 | S7 |
|---|---|---|---|---|---|---|---|
| K | −3.20E+00 | 2.98E+01 | −2.55E+01 | −7.90E+00 | 6.46E+01 | 9.77E+01 | 6.13E+01 |
| A4 | 1.28E−02 | −9.07E−03 | −3.28E−02 | −2.45E−02 | −2.10E−02 | −4.02E−02 | −4.82E−02 |
| A6 | −2.94E−03 | 5.55E−03 | 2.09E−02 | 1.46E−02 | 1.32E−02 | 2.25E−02 | 2.75E−02 |
| A8 | 4.01E−03 | 8.56E−04 | −8.83E−03 | 1.39E−02 | −2.79E−02 | −3.20E−02 | −4.16E−02 |
| A10 | −3.57E−03 | −3.87E−03 | 2.37E−03 | −1.09E−02 | 3.55E−02 | 2.66E−02 | 3.26E−02 |
| A12 | 2.00E−03 | 3.23E−03 | 6.34E−05 | 1.10E−02 | −2.93E−02 | −1.27E−02 | −1.31E−02 |
| A14 | −6.85E−04 | −1.46E−03 | −5.54E−04 | −6.29E−03 | 1.53E−02 | 3.70E−03 | 2.95E−03 |
| A16 | 1.39E−04 | 3.81E−04 | 2.96E−04 | 2.19E−03 | −4.85E−03 | −6.71E−04 | −3.98E−04 |
| A18 | −1.51E−05 | −5.41E−05 | −6.77E−05 | −4.28E−04 | 8.48E−04 | 7.13E−05 | 3.32E−05 |
| A20 | 6.71E−07 | 3.22E−06 | 5.88E−06 | 3.67E−05 | −6.13E−05 | −3.33E−06 | −1.46E−06 |

| Surface number | S8 | S9 | S10 | S11 | S12 | S13 | S14 |
|---|---|---|---|---|---|---|---|
| K | −9.80E+01 | 7.97E+00 | −6.83E−01 | −2.30E+01 | 8.34E+00 | −6.70E+01 | −5.91E+00 |
| A4 | −2.67E−02 | −1.21E−02 | −1.76E−02 | 4.34E−02 | 6.05E−02 | −3.78E−02 | −2.63E−02 |
| A6 | 1.88E−02 | 3.87E−02 | 2.67E−02 | −2.28E−02 | −3.04E−02 | 5.73E−03 | 5.16E−03 |
| A8 | −2.46E−02 | −3.01E−02 | −1.60E−02 | 4.76E−03 | 7.15E−03 | −9.43E−04 | −9.23E−04 |
| A10 | 1.50E−02 | 1.11E−02 | 4.87E−03 | −7.82E−04 | −1.10E−03 | 1.84E−04 | 1.21E−04 |
| A12 | −4.86E−03 | −2.40E−03 | −9.09E−04 | 1.38E−04 | 1.14E−04 | −2.38E−05 | −1.04E−05 |
| A14 | 9.01E−04 | 3.27E−04 | 1.16E−04 | −2.12E−05 | −7.96E−06 | 1.82E−06 | 5.69E−07 |
| A16 | −9.71E−05 | −2.93E−05 | −1.02E−05 | 2.06E−06 | 3.60E−07 | −8.05E−08 | −1.94E−08 |
| A18 | 5.75E−06 | 1.71E−06 | 5.32E−07 | −1.05E−07 | −9.49E−09 | 1.93E−09 | 3.80E−10 |
| A20 | −1.41E−07 | −5.04E−08 | −1.22E−08 | 2.10E−09 | 1.12E−10 | −1.94E−11 | −3.27E−12 |

FIG. 4b illustrates a longitudinal spherical aberration curve, an astigmatic curve, and a distortion curve of the optical system of FIG. 4a. The reference wavelength of light of the astigmatic curve and the distortion curve is 555 nm. The optical system in this embodiment has high imaging quality according to the FIG. 4b.

Figure 5A:
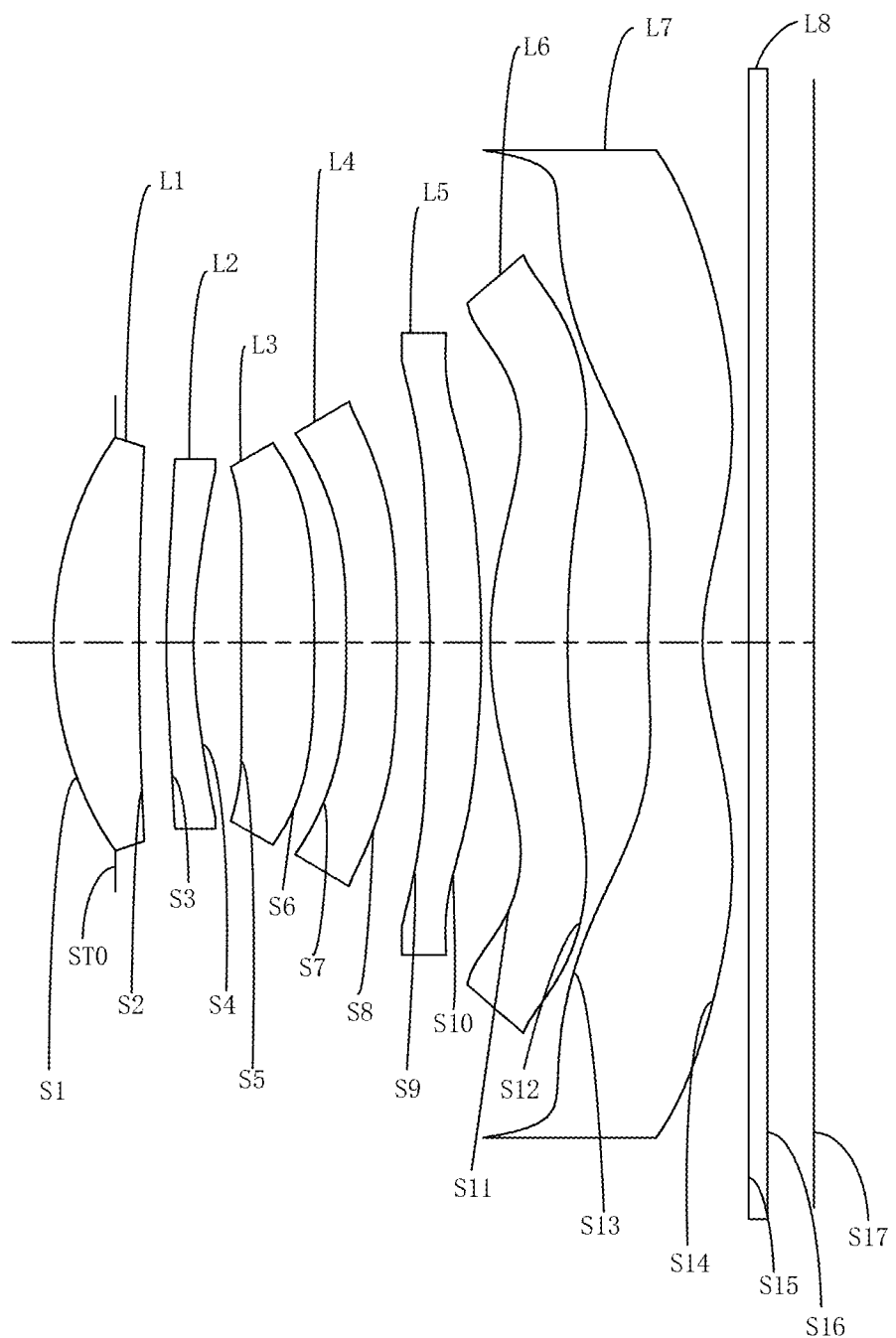
FIG. 5a is a schematic structural diagram of an optical system according to an embodiment of the disclosure.
Figure 5B:
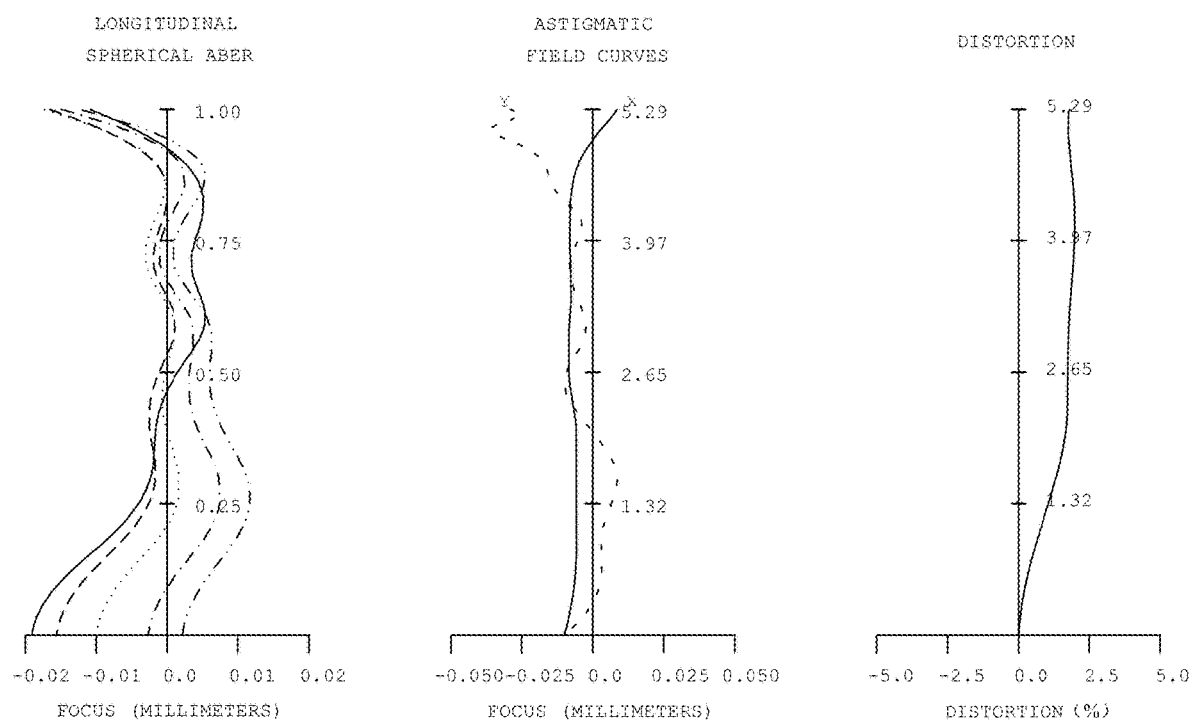

Referring to FIG. 5a and FIG. 5b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a negative refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is convex at the optical axis and at the circumference.

The fifth lens L5 with a negative refractive power has an object-side surface S9 which is concave at an optical axis and at a circumference, and has an image-side surface S10 which is convex at the optical axis and concave at the circumference.

The sixth lens L6 with a positive refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 5a illustrates characteristics of the optical system in this embodiment, where data is obtained by using light with a wavelength of 555 nm. The Y radius, the thickness, and the focal length are measured in mm.

TABLE 5a

Embodiment of FIG. 5a
f = 6.44 mm, FNO = 1.66, FOV = 77.8 deg, TTL = 8.4 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | −0.6844 | | | | |
| S1 | First lens | aspheric | 3.1785 | 0.9450 | plastic | 1.55 | 56.11 | 6.58 |
| S2 | | aspheric | 24.7680 | 0.3000 | | | | |
| S3 | Second lens | aspheric | 6.4643 | 0.3015 | plastic | 1.67 | 20.37 | −13.72 |
| S4 | | aspheric | 3.7184 | 0.5241 | | | | |
| S5 | Third lens | aspheric | 23.2102 | 0.8106 | plastic | 1.54 | 55.75 | 18.25 |
| S6 | | aspheric | −16.7378 | 0.3532 | | | | |
| S7 | Fourth lens | aspheric | −14.5398 | 0.5564 | plastic | 1.67 | 20.37 | −38.88 |
| S8 | | aspheric | −33.5892 | 0.3643 | | | | |
| S9 | Fifth lens | aspheric | −8.2713 | 0.5667 | plastic | 1.55 | 56.11 | −100.00 |
| S10 | | aspheric | −9.9843 | 0.1000 | | | | |
| S11 | Sixth lens | aspheric | 3.1178 | 0.8570 | plastic | 1.54 | 55.75 | 7.63 |
| S12 | | aspheric | 11.8192 | 0.8872 | | | | |
| S13 | Seventh lens | aspheric | 5.9656 | 0.6000 | plastic | 1.54 | 55.75 | −5.61 |
| S14 | | aspheric | 1.9306 | 0.5069 | | | | |
| S15 | Infrared cut filter | spheric | Infinity | 0.2100 | glass | | | |
| S16 | | spheric | Infinity | 0.5122 | | | | |
| S17 | Imaging surface | spheric | Infinity | 0.0000 | | | | |

Note:
a reference wavelength is 555 nm

In Table 5a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 5b shows high-order coefficients used in each of aspheric lens surfaces in this embodiment, where the aspheric surface profile is limited by the equation in the embodiment of FIG. 1a.

TABLE 5b

Embodiment of FIG. 5a
Aspheric coefficients

| Surface number | S1 | S2 | S3 | S4 | S5 | S6 | S7 |
|---|---|---|---|---|---|---|---|
| K | −3.09E+00 | 6.69E+00 | −2.62E+01 | −8.03E+00 | 3.72E+01 | 6.22E+01 | 4.65E+01 |
| A4 | 1.34E−02 | −6.35E−03 | −2.80E−02 | −2.00E−02 | −1.86E−02 | −2.86E−02 | −5.51E−02 |
| A6 | −3.01E−03 | 1.87E−03 | 1.09E−02 | 8.82E−03 | 1.54E−02 | 6.62E−03 | 2.29E−02 |
| A8 | 4.34E−03 | 4.63E−03 | 4.38E−03 | 2.33E−03 | −3.90E−02 | −4.47E−03 | −1.88E−02 |
| A10 | −4.08E−03 | −7.46E−03 | −1.17E−02 | −6.50E−03 | 5.17E−02 | 5.49E−06 | 1.26E−02 |
| A12 | 2.40E−03 | 5.73E−03 | 1.05E−02 | 4.69E−03 | −4.34E−02 | 1.97E−03 | −5.26E−03 |
| A14 | −8.70E−04 | −2.58E−03 | −5.43E−03 | −1.93E−03 | 2.27E−02 | −1.41E−03 | 1.46E−03 |

TABLE 5b-continued

Embodiment of FIG. 5a
Aspheric coefficients

| | | | | | | | |
|---|---|---|---|---|---|---|---|
| A16 | 1.88E-04 | 6.88E-04 | 1.68E-03 | 5.15E-04 | -7.15E-03 | 4.76E-04 | -2.72E-04 |
| A18 | -2.20E-05 | -1.00E-04 | -2.84E-04 | -9.16E-05 | 1.24E-03 | -8.28E-05 | 3.07E-05 |
| A20 | 1.07E-06 | 6.13E-06 | 2.04E-05 | 9.20E-06 | -8.83E-05 | 6.04E-06 | -1.48E-06 |

| Surface number | S8 | S9 | S10 | s11 | S12 | S13 | S14 |
|---|---|---|---|---|---|---|---|
| K | -4.88E+01 | -9.80E+01 | 5.37E+00 | -1.40E+01 | 8.41E+00 | -5.98E+01 | -5.67E+00 |
| A4 | -4.60E-02 | -5.20E-03 | -1.28E-02 | 3.21E-02 | 2.49E-02 | -5.68E-02 | -3.30E-02 |
| A6 | 3.17E-02 | 3.46E-02 | 2.15E-02 | -1.90E-02 | -9.45E-03 | 1.06E-02 | 7.25E-03 |
| A8 | -2.84E-02 | -3.25E-02 | -1.52E-02 | 5.64E-03 | 8.37E-04 | -1.62E-03 | -1.31E-03 |
| A10 | 1.60E-02 | 1.47E-02 | 5.58E-03 | -1.48E-03 | 9.70E-05 | 2.75E-04 | 1.76E-04 |
| A12 | -5.57E-03 | -4.05E-03 | -1.27E-03 | 2.97E-04 | -3.49E-05 | -3.55E-05 | -1.60E-05 |
| A14 | 1.25E-03 | 7.15E-04 | 1.92E-04 | -3.91E-05 | 4.38E-06 | 2.88E-06 | 9.55E-07 |
| A16 | -1.82E-04 | -7.98E-05 | -1.86E-05 | 3.08E-06 | -3.03E-07 | -1.38E-07 | -3.54E-08 |
| A18 | 1.54E-05 | 5.12E-06 | 1.04E-06 | -1.28E-07 | 1.14E-08 | 3.61E-09 | 7.42E-10 |
| A20 | -5.76E-07 | -1.44E-07 | -2.51E-08 | 2.08E-09 | -1.80E-10 | -3.97E-11 | -6.71E-12 |

FIG. 5b illustrates a longitudinal spherical aberration curve, an astigmatic curve, and a distortion curve of the optical system of FIG. 5a. The reference wavelength of light of the astigmatic curve and the distortion curve is 555 nm. The optical system in this embodiment has high imaging quality according to the FIG. 5b.

Figure 6A:
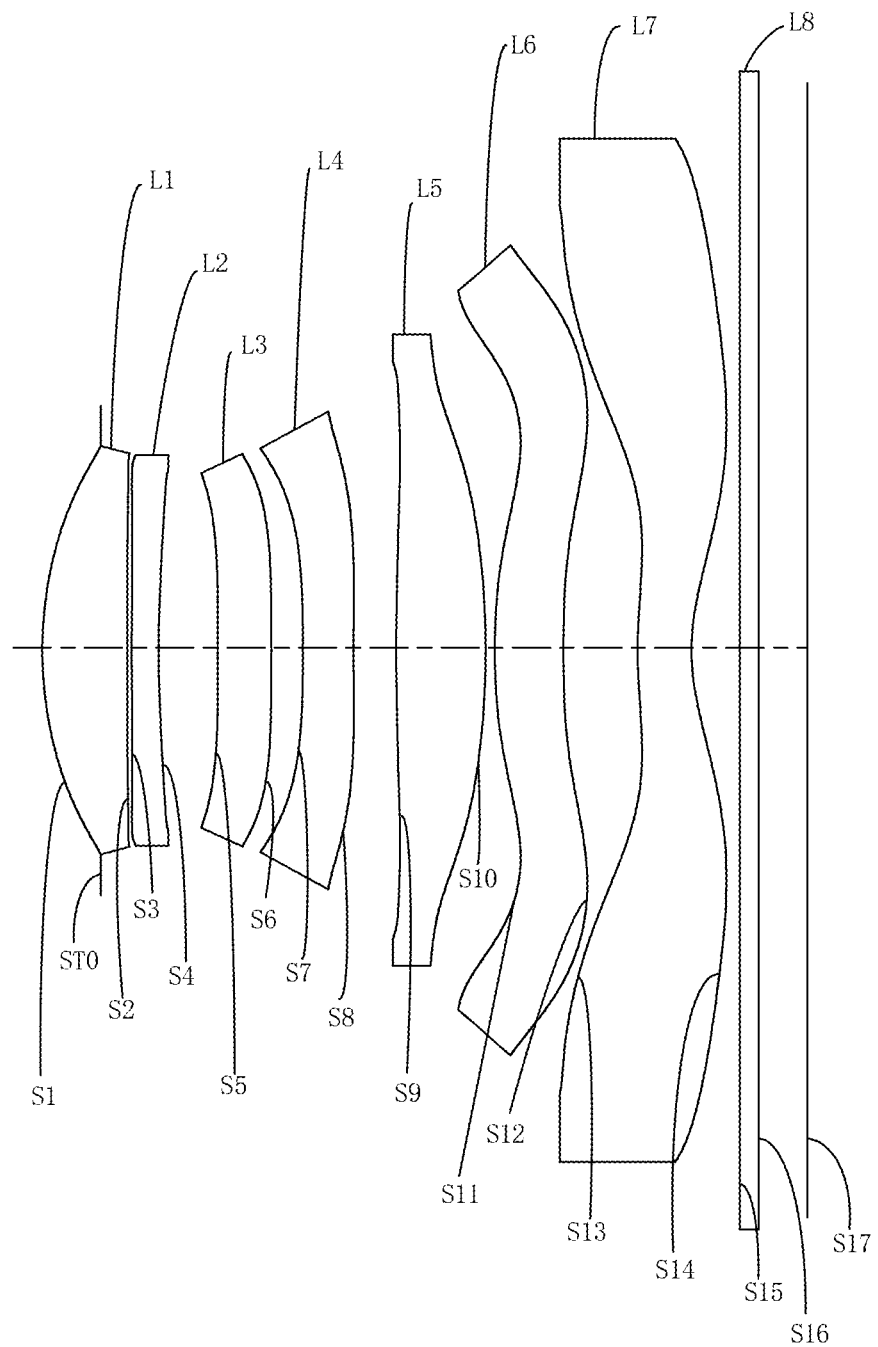
FIG. 6a is a schematic structural diagram of an optical system according to an embodiment of the disclosure.
Figure 6B:
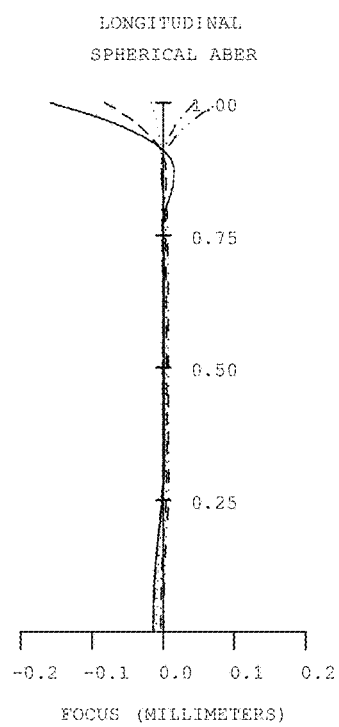
Figure 6B:
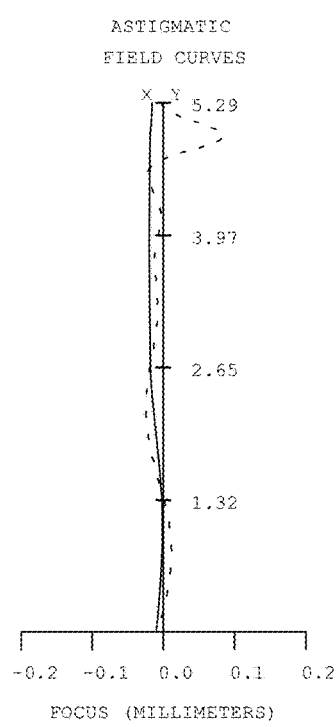
Figure 6B:
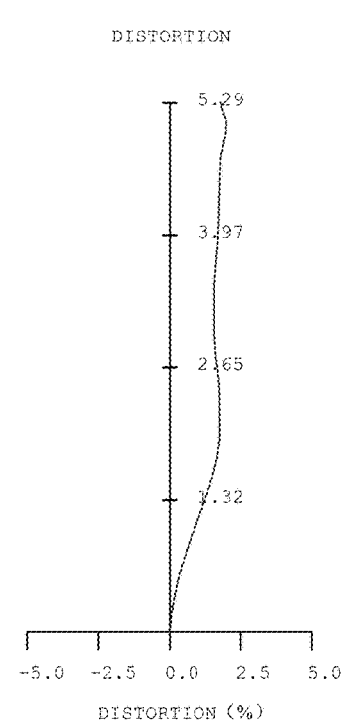

Referring to FIG. 6a and FIG. 6b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a negative refractive power has an object-side surface S3 which is convex at an optical axis and at a circumference, and has an image-side surface S4 which is concave at the optical axis and at the circumference.

The third lens L3 with a negative refractive power has an object-side surface S5 which is concave at an optical axis and at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is concave at the optical axis and convex at the circumference.

The fifth lens L5 with a positive refractive power has an object-side surface S9 which is convex at an optical axis and concave at a circumference, and has an image-side surface S10 which is convex at the optical axis and at the circumference.

The sixth lens L6 with a positive refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 6a illustrates characteristics of the optical system in this embodiment, where data is obtained by using light with a wavelength of 555 nm. The Y radius, the thickness, and the focal length are measured in mm.

TABLE 6a

Embodiment of FIG. 6a
f = 6.42 mm, FNO = 1.69, FOV = 77.9 deg, TTL = 8.54 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | -0.6520 | | | | |
| S1 | First | aspheric | 3.1671 | 0.9446 | plastic | 1.55 | 56.11 | 6.15 |
| S2 | lens | aspheric | 49.8704 | 0.0500 | | | | |
| S3 | Second | aspheric | 23.4389 | 0.3019 | plastic | 1.67 | 20.37 | -21.95 |
| S4 | lens | aspheric | 8.9672 | 0.6608 | | | | |
| S5 | Third | aspheric | -100.3299 | 0.5990 | plastic | 1.54 | 55.75 | -7627.55 |
| S6 | lens | aspheric | -103.0647 | 0.3492 | | | | |
| S7 | Fourth | aspheric | -26.1268 | 0.5663 | plastic | 1.67 | 20.37 | -16.77 |
| S8 | lens | aspheric | 19.7419 | 0.4765 | | | | |
| S9 | Fifth | aspheric | 16.8590 | 0.9996 | plastic | 1.55 | 56.11 | 8.63 |
| S10 | lens | aspheric | -6.3969 | 0.1018 | | | | |
| S11 | Sixth | aspheric | 5.7867 | 0.7651 | plastic | 1.54 | 55.75 | 20.28 |
| S12 | lens | aspheric | 11.7815 | 0.8287 | | | | |

TABLE 6a-continued

Embodiment of FIG. 6a
f = 6.42 mm, FNO = 1.69, FOV = 77.9 deg, TTL = 8.54 mm

| Surface number | Surface name | Surface type | Y radius | Thickness | Material | Refractive index | Abbe number | Focal length |
|---|---|---|---|---|---|---|---|---|
| S13 | Seventh lens | aspheric | 3.9338 | 0.6004 | plastic | 1.54 | 55.75 | −5.92 |
| S14 | | aspheric | 1.6642 | 0.5388 | | | | |
| S15 | Infrared cut filter | spheric | Infinity | 0.2100 | glass | | | |
| S16 | | spheric | Infinity | 0.5449 | | | | |
| S17 | Imaging surface | spheric | Infinity | 0.0000 | | | | |

Note:
a reference wavelength is 555 nm

In Table 6a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 6b shows high-order coefficients used in each of aspheric lens surfaces in this embodiment, where the aspheric surface profile is limited by the equation in the embodiment of FIG. 1a.

TABLE 6b

Embodiment of FIG. 6a
Aspheric coefficients

| Surface number | S1 | S2 | S3 | S4 | S5 | S6 | S7 |
|---|---|---|---|---|---|---|---|
| K   | −3.03E+00 | 4.61E+01  | 8.83E+01  | −1.60E+01 | 7.36E+01  | 9.80E+01  | 9.73E+01 |
| A4  | 1.55E−02  | −1.47E−02 | −3.13E−02 | −1.65E−02 | −1.95E−02 | −3.32E−02 | −6.01E−02 |
| A6  | −9.67E−03 | 1.51E−02  | 2.66E−02  | 1.83E−03  | −5.20E−03 | 2.05E−02  | 5.57E−02 |
| A8  | 2.01E−02  | −3.14E−03 | −1.74E−02 | 1.75E−02  | 1.19E−02  | −2.64E−02 | −7.04E−02 |
| A10 | −2.41E−02 | −6.26E−03 | 7.36E−03  | −3.54E−02 | −1.91E−02 | 2.01E−02  | 6.09E−02 |
| A12 | 1.76E−02  | 6.74E−03  | −1.62E−03 | 3.64E−02  | 1.84E−02  | −9.41E−03 | −3.56E−02 |
| A14 | −7.88E−03 | −3.28E−03 | −9.44E−06 | −2.18E−02 | −1.10E−02 | 2.64E−03  | 1.39E−02 |
| A16 | 2.12E−03  | 8.94E−04  | 1.16E−04  | 7.70E−03  | 3.98E−03  | −4.08E−04 | −3.52E−03 |
| A18 | −3.12E−04 | −1.38E−04 | −3.50E−05 | −1.48E−03 | −8.09E−04 | 2.28E−05  | 5.12E−04 |
| A20 | 1.93E−05  | 9.84E−06  | 4.29E−06  | 1.21E−04  | 7.13E−05  | 1.12E−06  | −3.21E−05 |

| Surface number | S8 | S9 | S10 | S11 | S12 | S13 | S14 |
|---|---|---|---|---|---|---|---|
| K   | 6.43E+01  | 1.82E+01  | −2.93E−02 | −1.19E+01 | 8.01E+00  | −2.57E+01 | −4.54E+00 |
| A4  | −5.61E−02 | −2.80E−02 | 4.00E−03  | 4.46E−02  | 3.53E−02  | −5.38E−02 | −3.70E−02 |
| A6  | 4.60E−02  | 3.29E−02  | −2.18E−03 | −2.43E−02 | −1.12E−02 | 5.68E−03  | 7.89E−03 |
| A8  | −3.98E−02 | −2.19E−02 | −6.08E−05 | 7.38E−03  | 3.67E−04  | 3.92E−04  | −1.33E−03 |
| A10 | 2.30E−02  | 8.53E−03  | −1.14E−04 | −2.05E−03 | 3.33E−04  | −1.21E−04 | 1.66E−04 |
| A12 | −8.67E−03 | −2.12E−03 | 1.12E−04  | 4.30E−04  | −7.95E−05 | 8.30E−06  | −1.39E−05 |
| A14 | 2.15E−03  | 3.47E−04  | −2.92E−05 | −5.89E−05 | 9.11E−06  | 9.40E−09  | 7.56E−07 |
| A16 | −3.42E−04 | −3.61E−05 | 3.79E−06  | 4.87E−06  | −5.98E−07 | −2.87E−08 | −2.53E−08 |
| A18 | 3.19E−05  | 2.19E−06  | −2.56E−07 | −2.19E−07 | 2.15E−08  | 1.40E−09  | 4.74E−10 |
| A20 | −1.32E−06 | −5.90E−08 | 7.21E−09  | 4.13E−09  | −3.29E−10 | −2.21E−11 | −3.83E−12 |

FIG. 6b illustrates a longitudinal spherical aberration curve, an astigmatic curve, and a distortion curve of the optical system of FIG. 6a. The reference wavelength of light of the astigmatic curve and the distortion curve is 555 nm. The optical system in this embodiment has high imaging quality according to the FIG. 6b.

Figure 7A:
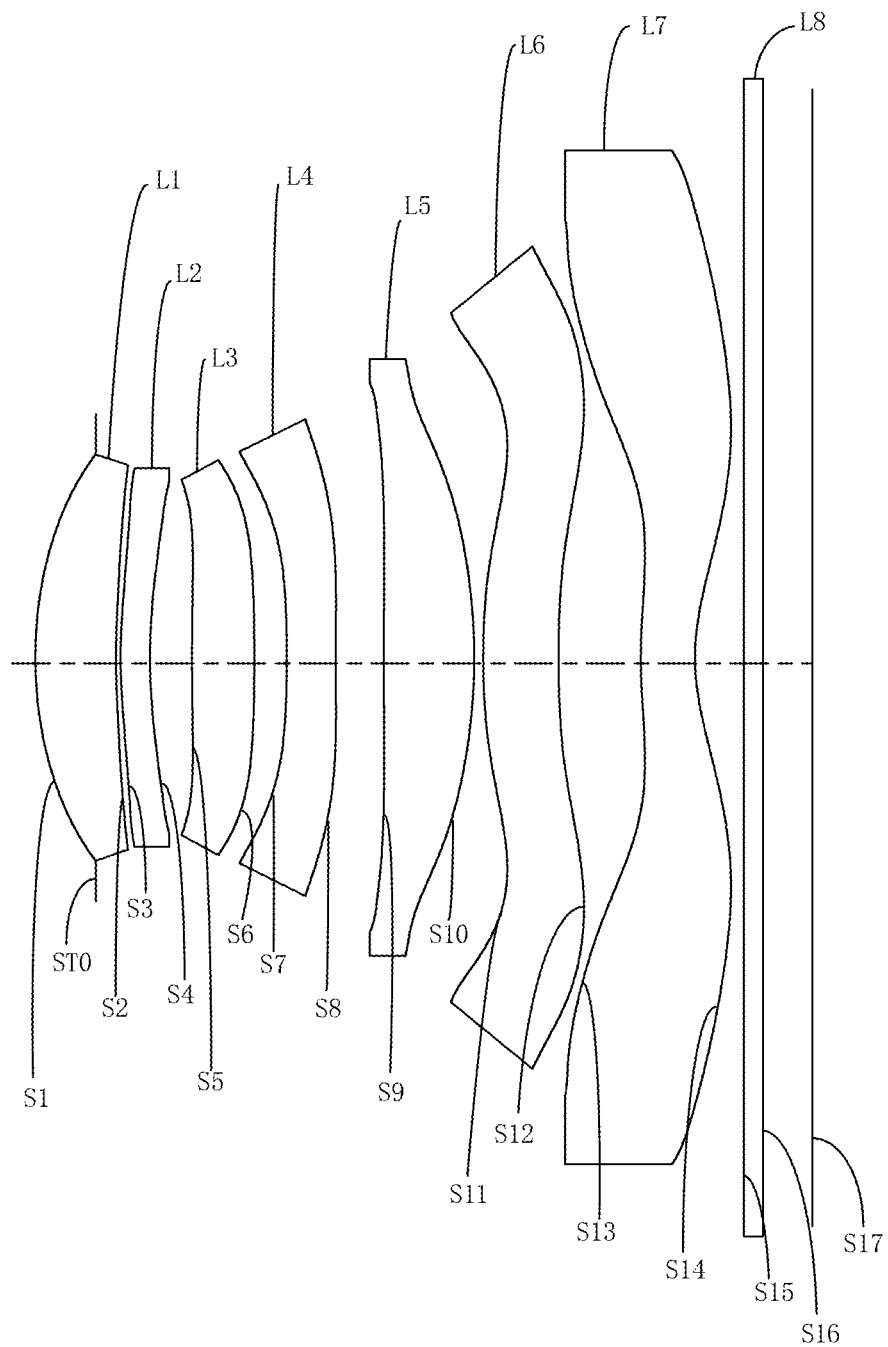
FIG. 7a is a schematic structural diagram of an optical system according to an embodiment of the disclosure.
Figure 7B:
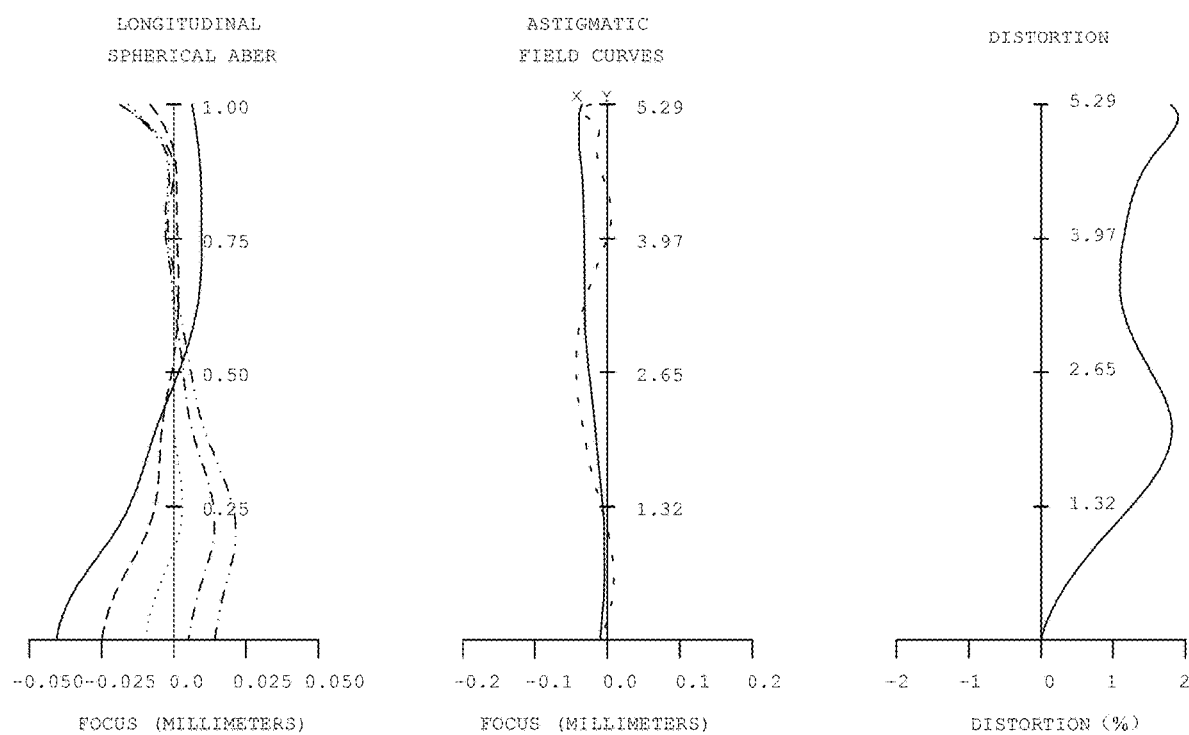

Referring to FIG. 7a and FIG. 7b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a positive refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is concave at the optical axis and convex at the circumference.

The fifth lens L5 with a positive refractive power has an object-side surface S9 which is convex at an optical axis and concave at a circumference, and has an image-side surface S10 which is convex at the optical axis and at the circumference.

The sixth lens L6 with a positive refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 7a illustrates characteristics of the optical system in this embodiment, where data is obtained by using light with a wavelength of 555 nm. The Y radius, the thickness, and the focal length are measured in mm.

TABLE 7a

Embodiment of FIG. 7a
f = 6.27 mm, FNO = 1.66, FOV = 79.2 deg, TTL = 8.6 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | −0.6701 | | | | |
| S1 | First | aspheric | 3.2874 | 0.8936 | plastic | 1.55 | 56.11 | 10.50 |
| S2 | lens | aspheric | 6.9676 | 0.0513 | | | | |
| S3 | Second | aspheric | 4.6451 | 0.3237 | plastic | 1.67 | 20.37 | 100000.00 |
| S4 | lens | aspheric | 4.5158 | 0.4666 | | | | |
| S5 | Third | aspheric | 24.0519 | 0.6887 | plastic | 1.54 | 55.75 | 21.77 |
| S6 | lens | aspheric | −22.5089 | 0.3585 | | | | |
| S7 | Fourth | aspheric | −15.9215 | 0.5426 | plastic | 1.67 | 20.37 | −12.87 |
| S8 | lens | aspheric | 18.8966 | 0.5323 | | | | |
| S9 | Fifth | aspheric | 33.4683 | 1.0000 | plastic | 1.55 | 56.11 | 7.59 |
| S10 | lens | aspheric | −4.6811 | 0.1000 | | | | |
| S11 | Sixth | aspheric | 6.3729 | 0.8353 | plastic | 1.54 | 55.75 | 24.27 |
| S12 | lens | aspheric | 11.9063 | 0.9094 | | | | |
| S13 | Seventh | aspheric | 4.4381 | 0.6000 | plastic | 1.54 | 55.75 | −5.91 |
| S14 | lens | aspheric | 1.7622 | 0.5414 | | | | |
| S15 | Infrared | spheric | Infinity | 0.2100 | glass | | | |
| S16 | cut filter | spheric | Infinity | 0.5465 | | | | |
| S17 | Imaging surface | spheric | Infinity | 0.0000 | | | | |

Note:
a reference wavelength is 555 nm

In Table 7a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 7b shows high-order coefficients used in each of aspheric lens surfaces in this embodiment, where the aspheric surface profile is limited by the equation in the embodiment of FIG. 1a.

TABLE 7b

Embodiment of FIG. 7a
Aspheric coefficients

| Surface number | S1 | S2 | S3 | S4 | S5 | S6 | S7 |
|---|---|---|---|---|---|---|---|
| K | −2.80E+00 | −4.99E+01 | −2.32E+01 | −8.24E+00 | 3.37E+01 | 8.54E+01 | 5.45E+01 |
| A4 | 1.44E−02 | −1.43E−02 | −1.82E−02 | −2.48E−03 | −3.30E−02 | −2.45E−02 | −7.03E−02 |
| A6 | −6.97E−03 | −1.65E−02 | −1.57E−02 | −2.59E−02 | −2.35E−02 | 1.61E−02 | 6.56E−02 |
| A8 | 1.22E−02 | 6.09E−02 | 4.21E−02 | 4.93E−02 | 3.89E−02 | −2.56E−02 | −8.15E−02 |
| A10 | −1.21E−02 | −7.95E−02 | −5.00E−02 | −6.12E−02 | −5.29E−02 | 1.97E−02 | 6.91E−02 |
| A12 | 7.30E−03 | 6.01E−02 | 3.73E−02 | 5.06E−02 | 4.58E−02 | −9.33E−03 | −3.89E−02 |
| A14 | −2.67E−03 | −2.79E−02 | −1.76E−02 | −2.70E−02 | −2.54E−02 | 2.63E−03 | 1.45E−02 |
| A16 | 5.75E−04 | 7.75E−03 | 5.02E−03 | 8.94E−03 | 8.72E−03 | −3.65E−04 | −3.44E−03 |
| A18 | −6.53E−05 | −1.18E−03 | −7.88E−04 | −1.66E−03 | −1.69E−03 | 5.69E−06 | 4.64E−04 |
| A20 | 2.92E−06 | 7.58E−05 | 5.19E−05 | 1.33E−04 | 1.41E−04 | 2.86E−06 | −2.69E−05 |

TABLE 7b-continued

Embodiment of FIG. 7a
Aspheric coefficients

| Surface number | S8 | S9 | S10 | S11 | S12 | S13 | S14 |
|---|---|---|---|---|---|---|---|
| K | 2.73E+01 | −1.35E+01 | −8.39E−01 | −1.37E+01 | 7.99E+00 | −3.23E+01 | −4.31E+00 |
| A4 | −6.71E−02 | −3.07E−02 | −1.64E−03 | 3.69E−02 | 3.65E−02 | −4.08E−02 | −3.34E−02 |
| A6 | 5.63E−02 | 3.49E−02 | 4.11E−03 | −1.81E−02 | −1.53E−02 | 4.02E−04 | 6.48E−03 |
| A8 | −4.97E−02 | −2.33E−02 | −3.24E−03 | 3.98E−03 | 2.89E−03 | 1.18E−03 | −1.08E−03 |
| A10 | 2.98E−02 | 9.34E−03 | 8.61E−04 | −6.42E−04 | −3.70E−04 | −1.25E−04 | 1.41E−04 |
| A12 | −1.16E−02 | −2.46E−03 | −7.11E−05 | 6.09E−05 | 3.47E−05 | −5.11E−06 | −1.26E−05 |
| A14 | 2.98E−03 | 4.35E−04 | −1.42E−05 | −4.53E−07 | −2.33E−06 | 1.80E−06 | 7.21E−07 |
| A16 | −4.83E−04 | −5.01E−05 | 4.66E−06 | −5.54E−08 | 9.96E−08 | −1.38E−07 | −2.53E−08 |
| A18 | 4.51E−05 | 3.40E−06 | −5.05E−07 | 5.23E−08 | −2.14E−09 | 4.74E−09 | 4.97E−10 |
| A20 | −1.83E−06 | −1.03E−07 | 1.97E−08 | −1.54E−09 | 1.29E−11 | −6.33E−11 | −4.20E−12 |

FIG. 7b illustrates a longitudinal spherical aberration curve, an astigmatic curve, and a distortion curve of the optical system of FIG. 7a. The reference wavelength of light of the astigmatic curve and the distortion curve is 555 nm. The optical system in this embodiment has high imaging quality according to the FIG. 7b.

Figure 8A:
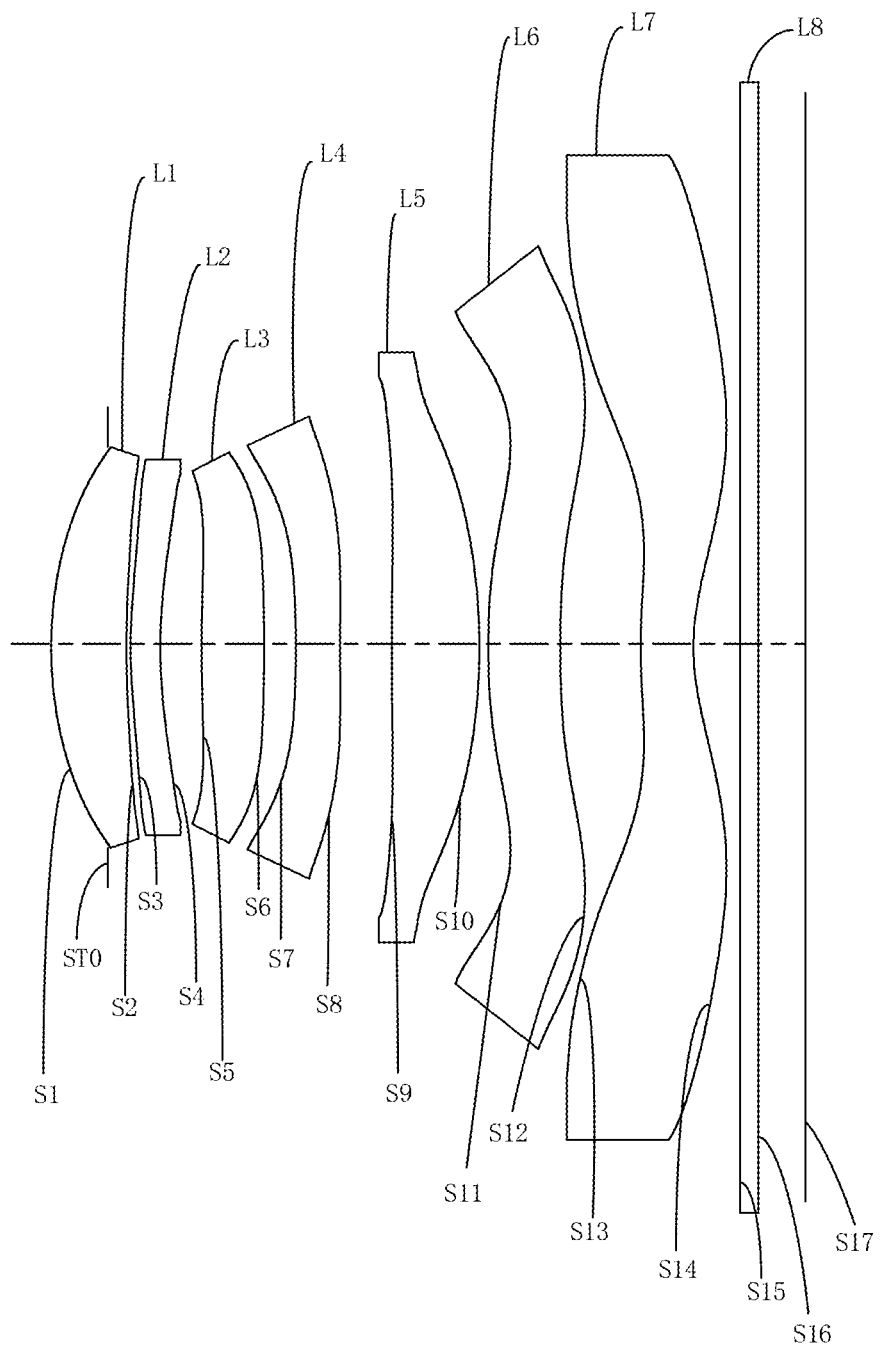
FIG. 8a is a schematic structural diagram of an optical system according to an embodiment of the disclosure.
Figure 8B:
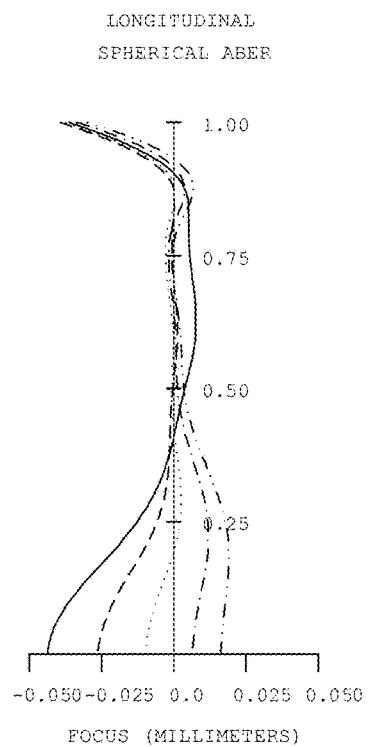
Figure 8B:
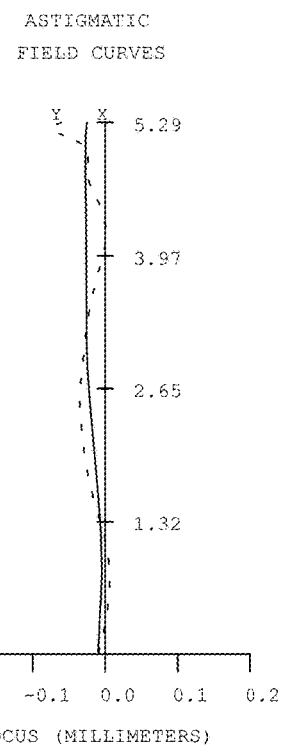
Figure 8B:
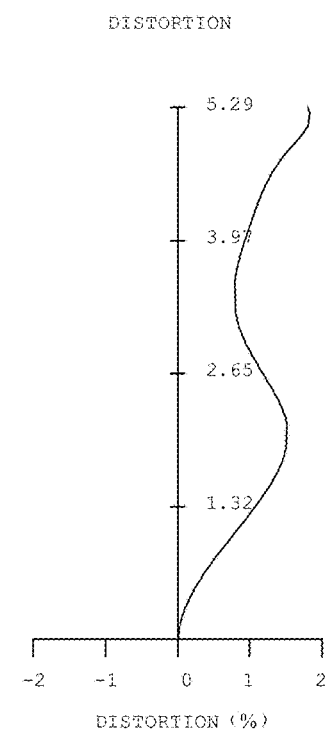

Referring to FIG. 8a and FIG. 8b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a positive refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is concave at the optical axis and convex at the circumference.

The fifth lens L5 with a positive refractive power has an object-side surface S9 which is convex at an optical axis and concave at a circumference, and has an image-side surface S10 which is convex at the optical axis and at the circumference.

The sixth lens L6 with a positive refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 8a illustrates characteristics of the optical system in this embodiment, where data is obtained by using light with a wavelength of 555 nm. The Y radius, the thickness, and the focal length are measured in mm.

TABLE 8a

Embodiment of FIG. 8a
f = 6.34 mm, FNO = 1.66, FOV = 78.6 deg, TTL = 8.6 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | −0.6437 | | | | |
| S1 | First | aspheric | 3.2929 | 0.8569 | plastic | 1.55 | 56.11 | 11.02 |
| S2 | lens | aspheric | 6.6057 | 0.0500 | | | | |
| S3 | Second | aspheric | 4.2668 | 0.3377 | plastic | 1.67 | 20.37 | 9996.61 |
| S4 | lens | aspheric | 4.1343 | 0.4733 | | | | |
| S5 | Third | aspheric | 16.7587 | 0.7084 | plastic | 1.54 | 55.75 | 19.87 |
| S6 | lens | aspheric | −28.8879 | 0.3616 | | | | |
| S7 | Fourth | aspheric | −15.2933 | 0.5079 | plastic | 1.67 | 20.37 | −13.76 |
| S8 | lens | aspheric | 23.2574 | 0.5876 | | | | |
| S9 | Fifth | aspheric | 29.6725 | 1.0000 | plastic | 1.55 | 56.11 | 7.74 |
| S10 | lens | aspheric | −4.8713 | 0.1000 | | | | |
| S11 | Sixth | aspheric | 6.4201 | 0.8224 | plastic | 1.54 | 55.75 | 24.88 |
| S12 | lens | aspheric | 11.8107 | 0.9167 | | | | |
| S13 | Seventh | aspheric | 5.0578 | 0.6000 | plastic | 1.54 | 55.75 | −5.66 |
| S14 | lens | aspheric | 1.8204 | 0.5312 | | | | |
| S15 | Infrared | spheric | Infinity | 0.2100 | glass | | | |

TABLE 8a-continued

Embodiment of FIG. 8a
f = 6.34 mm, FNO = 1.66, FOV = 78.6 deg, TTL = 8.6 mm

| Surface number | Surface name | Surface type | Y radius | Thickness | Material | Refractive index | Abbe number | Focal length |
|---|---|---|---|---|---|---|---|---|
| S16 | cut filter | spheric | Infinity | 0.5364 | | | | |
| S17 | Imaging surface | spheric | Infinity | 0.0000 | | | | |

Note:
a reference wavelength is 555 nm

In Table 8a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 8b shows high-order coefficients used in each of aspheric lens surfaces in this embodiment, where the aspheric surface profile is limited by the equation in the embodiment of FIG. 1a.

TABLE 8b

Embodiment of FIG. 8a
Aspheric coefficients

| Surface number | S1 | S2 | S3 | S4 | S5 | S6 | S7 |
|---|---|---|---|---|---|---|---|
| K   | −2.81E+00 | −5.43E+01 | −2.33E+01 | −8.70E+00 |  1.80E+01 |  9.80E+01 |  5.58E+01 |
| A4  |  1.41E−02 | −4.45E−02 | −4.42E−02 | −7.14E−03 | −4.63E−03 | −2.08E−02 | −6.51E−02 |
| A6  | −7.09E−03 |  4.90E−02 |  3.67E−02 | −1.85E−02 | −2.26E−02 |  6.83E−03 |  5.05E−02 |
| A8  |  1.23E−02 | −2.09E−02 | −1.44E−02 |  4.65E−02 |  4.18E−02 | −9.23E−03 | −6.04E−02 |
| A10 | −1.17E−02 | −5.84E−03 | −4.85E−03 | −6.14E−02 | −5.98E−02 |  2.78E−03 |  5.26E−02 |
| A12 |  6.80E−03 |  1.29E−02 |  9.25E−03 |  4.94E−02 |  5.26E−02 |  1.39E−03 | −3.12E−02 |
| A14 | −2.41E−03 | −7.48E−03 | −5.11E−03 | −2.51E−02 | −2.93E−02 | −1.76E−03 |  1.23E−02 |
| A16 |  5.04E−04 |  2.24E−03 |  1.47E−03 |  7.88E−03 |  1.00E−02 |  7.75E−04 | −3.04E−03 |
| A18 | −5.58E−05 | −3.47E−04 | −2.22E−04 | −1.41E−03 | −1.91E−03 | −1.65E−04 |  4.17E−04 |
| A20 |  2.40E−06 |  2.19E−05 |  1.36E−05 |  1.09E−04 |  1.56E−04 |  1.40E−05 | −2.41E−05 |

| Surface number | S8 | S9 | S10 | S11 | S12 | S13 | S14 |
|---|---|---|---|---|---|---|---|
| K   |  3.24E+01 | −3.58E+00 | −7.18E−01 | −1.50E+01 |  8.06E+00 | −3.33E+01 | −4.48E+00 |
| A4  | −6.06E−02 | −2.27E−02 |  1.49E−03 |  3.61E−02 |  3.40E−02 | −5.18E−02 | −3.63E−02 |
| A6  |  4.06E−02 |  2.28E−02 | −6.74E−04 | −1.86E−02 | −1.26E−02 |  8.12E−03 |  8.46E−03 |
| A8  | −3.22E−02 | −1.48E−02 | −4.93E−04 |  4.89E−03 |  1.81E−03 | −1.16E−03 | −1.64E−03 |
| A10 |  1.84E−02 |  5.94E−03 |  8.54E−05 | −1.10E−03 | −1.32E−04 |  2.65E−04 |  2.27E−04 |
| A12 | −7.00E−03 | −1.63E−03 |  4.35E−05 |  1.83E−04 |  1.60E−06 | −4.35E−05 | −2.04E−05 |
| A14 |  1.77E−03 |  3.09E−04 | −2.19E−05 | −2.01E−05 |  7.45E−07 |  4.06E−06 |  1.16E−06 |
| A16 | −2.89E−04 | −3.85E−05 |  4.61E−06 |  1.37E−06 | −8.54E−08 | −2.15E−07 | −4.05E−08 |
| A18 |  2.73E−05 |  2.81E−06 | −4.63E−07 | −5.26E−08 |  4.27E−09 |  6.06E−09 |  7.94E−10 |
| A20 | −1.12E−06 | −9.09E−08 |  1.77E−08 |  8.61E−10 | −8.35E−11 | −7.16E−11 | −6.70E−12 |

FIG. 8b illustrates a longitudinal spherical aberration curve, an astigmatic curve, and a distortion curve of the optical system of FIG. 8a. The reference wavelength of light of the astigmatic curve and the distortion curve is 555 nm. The optical system in this embodiment has high imaging quality according to the FIG. 8b.

Figure 9A:
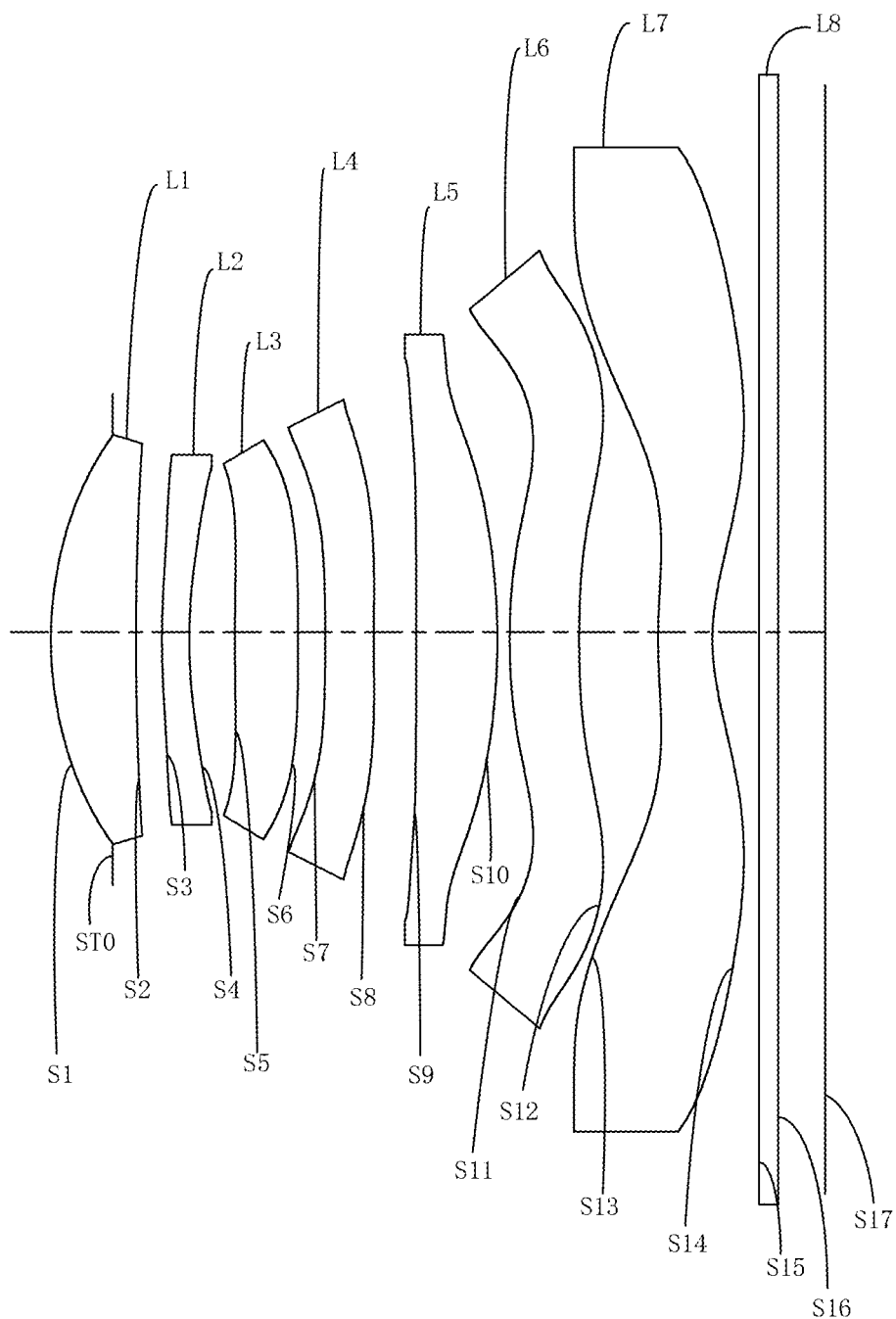
FIG. 9a is a schematic structural diagram of an optical system according to an embodiment of the disclosure.
Figure 9B:
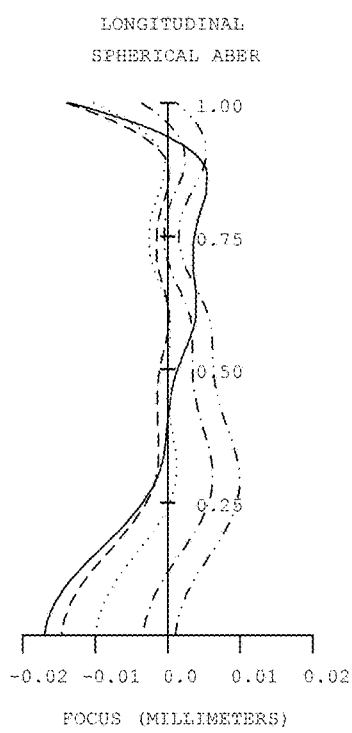
Figure 9B:
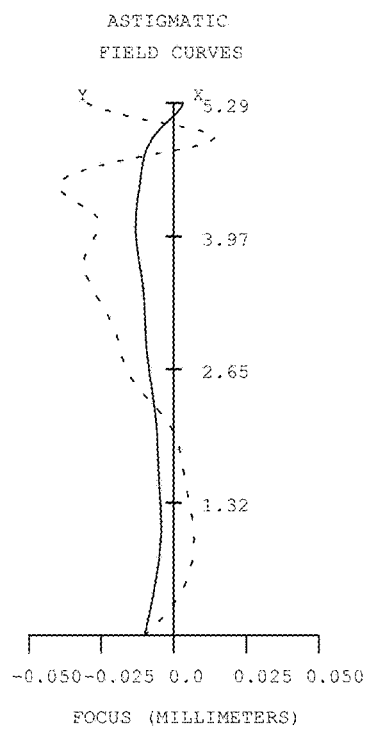
Figure 9B:
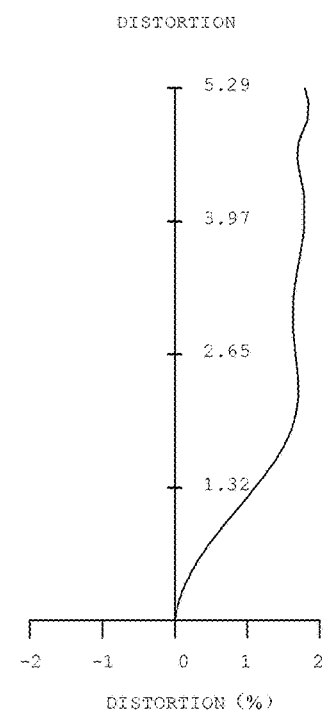

Referring to FIG. 9a and FIG. 9b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a negative refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is concave at the optical axis and convex at the circumference.

The fifth lens L5 with a positive refractive power has an object-side surface S9 which is convex at an optical axis and concave at a circumference, and has an image-side surface S10 which is convex at the optical axis and at the circumference.

The sixth lens L6 with a positive refractive power has an object-side surface S11 which is convex at an optical axis and concave at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 9a illustrates characteristics of the optical system in this embodiment, where data is obtained by using light with a wavelength of 555 nm. The Y radius, the thickness, and the focal length are measured in mm.

TABLE 9a

Embodiment of FIG. 9a
f = 6.49 mm, FNO = 1.66, FOV = 77.2 deg, TTL = 8.6 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | −0.6849 | | | | |
| S1 | First lens | aspheric | 3.2319 | 0.9450 | plastic | 1.55 | 56.11 | 6.84 |
| S2 | | aspheric | 21.5350 | 0.2880 | | | | |
| S3 | Second lens | aspheric | 6.6932 | 0.3015 | plastic | 1.67 | 20.37 | −14.69 |
| S4 | | aspheric | 3.9052 | 0.5084 | | | | |
| S5 | Third lens | aspheric | 24.0519 | 0.7005 | plastic | 1.54 | 55.75 | 31.61 |
| S6 | | aspheric | −22.5089 | 0.3014 | | | | |
| S7 | Fourth lens | aspheric | −15.9215 | 0.5406 | plastic | 1.67 | 20.37 | −29.40 |
| S8 | | aspheric | 18.8966 | 0.4732 | | | | |
| S9 | Fifth lens | aspheric | 33.4683 | 0.9002 | plastic | 1.55 | 56.11 | 9.49 |
| S10 | | aspheric | −4.6811 | 0.1388 | | | | |
| S11 | Sixth lens | aspheric | 6.3729 | 0.7719 | plastic | 1.54 | 55.75 | 21.83 |
| S12 | | aspheric | 11.9063 | 0.8770 | | | | |
| S13 | Seventh lens | aspheric | 4.4381 | 0.6012 | plastic | 1.54 | 55.75 | −5.71 |
| S14 | | aspheric | 1.7622 | 0.5180 | | | | |
| S15 | Infrared cut filter | spheric | Infinity | 0.2100 | glass | | | |
| S16 | | spheric | Infinity | 0.5237 | | | | |
| S17 | Imaging surface | spheric | Infinity | 0.0000 | | | | |

Note:
a reference wavelength is 555 nm

In Table 9a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 9b shows high-order coefficients used in each of aspheric lens surfaces in this embodiment, where the aspheric surface profile is limited by the equation in the embodiment of FIG. 1a.

TABLE 9b

Embodiment of FIG. 9a
Aspheric coefficients

| Surface number | S1 | S2 | S3 | S4 | S5 | S6 | S7 |
|---|---|---|---|---|---|---|---|
| K | −3.10E+00 | −1.55E+01 | −2.32E+01 | −7.76E+00 | 9.52E+00 | 1.30E+01 | 9.80E+01 |
| A4 | 1.36E−02 | −6.40E−03 | −3.15E−02 | −2.46E−02 | −2.06E−02 | −4.07E−02 | −7.29E−02 |
| A6 | −3.91E−03 | 2.06E−03 | 2.18E−02 | 2.23E−02 | 1.80E−02 | 3.70E−02 | 6.29E−02 |
| A8 | 5.71E−03 | 2.92E−03 | −1.91E−02 | −2.36E−02 | −3.55E−02 | −4.50E−02 | −5.71E−02 |
| A10 | −5.24E−03 | −4.22E−03 | 1.92E−02 | 2.42E−02 | 3.67E−02 | 3.31E−02 | 3.25E−02 |
| A12 | 3.02E−03 | 2.72E−03 | −1.42E−02 | −1.70E−02 | −2.37E−02 | −1.60E−02 | −1.14E−02 |
| A14 | −1.09E−03 | −1.02E−03 | 6.78E−03 | 7.32E−03 | 9.29E−03 | 5.19E−03 | 2.59E−03 |
| A16 | 2.36E−04 | 2.23E−04 | −1.96E−03 | −1.79E−03 | −2.06E−03 | −1.11E−03 | −4.05E−04 |
| A18 | −2.81E−05 | −2.64E−05 | 3.15E−04 | 2.08E−04 | 2.07E−04 | 1.40E−04 | 4.31E−05 |
| A20 | 1.42E−06 | 1.29E−06 | −2.13E−05 | −5.94E−06 | −2.71E−06 | −7.82E−06 | −2.36E−06 |

TABLE 9b-continued

Embodiment of FIG. 9a
Aspheric coefficients

| Surface number | S8 | S9 | S10 | S11 | S12 | S13 | S14 |
|---|---|---|---|---|---|---|---|
| K | 6.16E+01 | 8.79E+01 | −7.58E−01 | −1.53E+01 | 8.29E+00 | −4.64E+01 | −4.93E+00 |
| A4 | −7.12E−02 | −4.23E−02 | −7.99E−03 | 4.44E−02 | 4.59E−02 | −4.54E−02 | −3.35E−02 |
| A6 | 6.25E−02 | 4.90E−02 | 1.06E−02 | −2.28E−02 | −1.98E−02 | 3.83E−03 | 6.69E−03 |
| A8 | −4.81E−02 | −2.98E−02 | −7.15E−03 | 5.23E−03 | 3.41E−03 | 5.00E−04 | −1.10E−03 |
| A10 | 2.35E−02 | 1.05E−02 | 2.58E−03 | −9.56E−04 | −2.86E−04 | −1.18E−04 | 1.39E−04 |
| A12 | −7.36E−03 | −2.35E−03 | −6.28E−04 | 1.29E−04 | −2.25E−06 | 8.83E−06 | −1.19E−05 |
| A14 | 1.51E−03 | 3.46E−04 | 1.10E−04 | −9.63E−06 | 3.29E−06 | −2.26E−07 | 6.52E−07 |
| A16 | −2.02E−04 | −3.30E−05 | −1.24E−05 | 7.64E−08 | −3.51E−07 | −5.67E−09 | −2.18E−08 |
| A18 | 1.62E−05 | 1.86E−06 | 7.78E−07 | 3.56E−08 | 1.68E−08 | 4.39E−10 | 4.05E−10 |
| A20 | −6.00E−07 | −4.70E−08 | −2.03E−08 | −1.57E−09 | −3.15E−10 | −6.98E−12 | −3.22E−12 |

FIG. 9b illustrates a longitudinal spherical aberration curve, an astigmatic curve, and a distortion curve of the optical system of FIG. 9a. The reference wavelength of light of the astigmatic curve and the distortion curve is 555 nm. The optical system in this embodiment has high imaging quality according to the FIG. 9b.

Figure 10A:
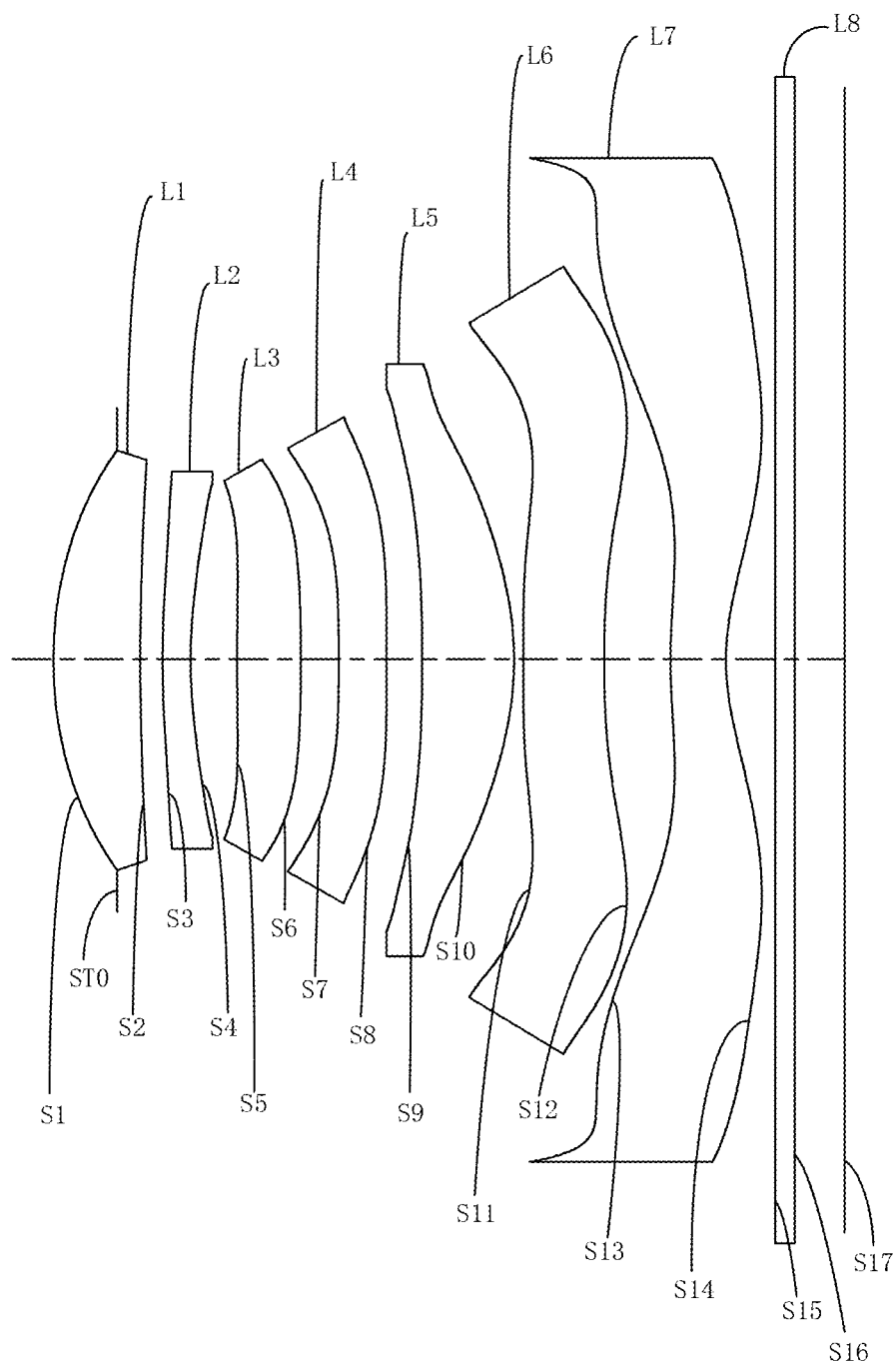
FIG. 10a is a schematic structural diagram of an optical system according to an embodiment of the disclosure.
Figure 10B:
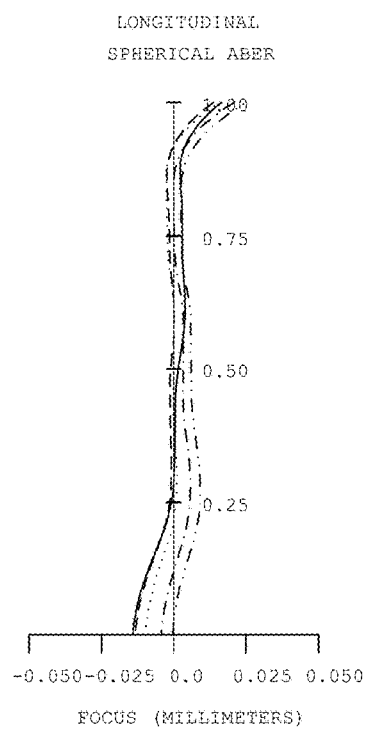
Figure 10B:
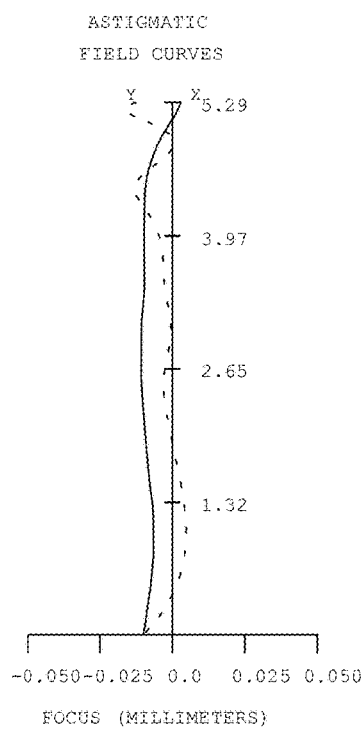
Figure 10B:
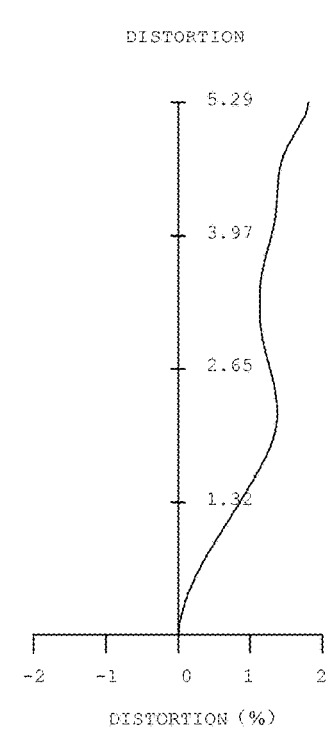

Referring to FIG. 10a and FIG. 10b, in this embodiment, an optical system includes, in order from an object side to an image side along an optical axis direction, a first lens L1, a second lens L2, a third lens L3, a fourth lens L4, a fifth lens L5, a sixth lens L6, and a seventh lens L7.

The first lens L1 with a positive refractive power has an object-side surface S1 which is convex at an optical axis and at a circumference, and has an image-side surface S2 which is concave at the optical axis and at the circumference.

The second lens L2 with a negative refractive power has an object-side surface S3 which is convex at an optical axis and at a circumference, and has an image-side surface S4 which is concave at the optical axis and at the circumference.

The third lens L3 with a positive refractive power has an object-side surface S5 which is convex at an optical axis and concave at a circumference, and has an image-side surface S6 which is convex at the optical axis and at the circumference.

The fourth lens L4 with a negative refractive power has an object-side surface S7 which is concave at an optical axis and at a circumference, and has an image-side surface S8 which is concave at the optical axis and convex at the circumference.

The fifth lens L5 with a positive refractive power has an object-side surface S9 which is concave at an optical axis and at a circumference, and has an image-side surface S10 which is convex at the optical axis and at the circumference.

The sixth lens L6 with a negative refractive power has an object-side surface S11 which is concave at an optical axis and at a circumference, and has an image-side surface S12 which is concave at the optical axis and convex at the circumference.

The seventh lens L7 with a negative refractive power has an object-side surface S13 which is convex at an optical axis and concave at a circumference, and has an image-side surface S14 which is concave at the optical axis and convex at the circumference.

Other structures in this embodiment are the same as those in the embodiment of FIG. 1a, so reference can be made to the above description.

Table 10a illustrates characteristics of the optical system in this embodiment, where data is obtained by using light with a wavelength of 555 nm. The Y radius, the thickness, and the focal length are measured in mm.

TABLE 10a

Embodiment of FIG. 10a
f = 6.44 mm, FNO = 1.66, FOV = 77.9 deg, TTL = 8.6 mm

| Surface number | Surface name | Surface type | Y radius | Thickness | Material | Refractive index | Abbe number | Focal length |
|---|---|---|---|---|---|---|---|---|
| Object surface | | spheric | Infinity | Infinity | | | | |
| STO | Stop | spheric | Infinity | −0.6912 | | | | |
| S1 | First lens | aspheric | 3.1813 | 0.9450 | plastic | 1.55 | 56.11 | 6.84 |
| S2 | | aspheric | 19.2908 | 0.2410 | | | | |
| S3 | Second | aspheric | 6.5850 | 0.3057 | plastic | 1.67 | 20.37 | −16.25 |
| S4 | lens | aspheric | 4.0201 | 0.5045 | | | | |
| S5 | Third | aspheric | 26.8667 | 0.6936 | plastic | 1.54 | 55.75 | 21.21 |
| S6 | lens | aspheric | −19.5761 | 0.4152 | | | | |
| S7 | Fourth | aspheric | −15.8433 | 0.5154 | plastic | 1.67 | 20.37 | −19.50 |
| S8 | lens | aspheric | 73.6629 | 0.3889 | | | | |
| S9 | Fifth lens | aspheric | −25.3085 | 0.9995 | plastic | 1.55 | 56.11 | 4.98 |
| S10 | | aspheric | −2.4882 | 0.1020 | | | | |
| S11 | Sixth lens | aspheric | −57.6425 | 0.8792 | plastic | 1.54 | 55.75 | −18.53 |
| S12 | | aspheric | 12.0848 | 0.7209 | | | | |

TABLE 10a-continued

Embodiment of FIG. 10a
f = 6.44 mm, FNO = 1.66, FOV = 77.9 deg, TTL = 8.6 mm

| Surface number | Surface name | Surface type | Y radius | Thickness | Material | Refractive index | Abbe number | Focal length |
|---|---|---|---|---|---|---|---|---|
| S13 | Seventh | aspheric | 5.0982 | 0.6000 | plastic | 1.54 | 55.75 | −5.81 |
| S14 | lens | aspheric | 1.8554 | 0.5369 | | | | |
| S15 | Infrared | spheric | Infinity | 0.2100 | glass | | | |
| S16 | cut filter | spheric | Infinity | 0.5420 | | | | |
| S17 | Imaging surface | spheric | Infinity | 0.0000 | | | | |

Note:
a reference wavelength is 555 nm

In Table 10a, f represents an effective focal length of the optical system, FNO represents an F-number of the optical system, FOV represents a maximum angle of view of the optical system in a diagonal direction, and TTL represents a distance from the object-side surface of the first lens to the imaging surface of the optical system on the optical axis.

Table 10b shows high-order coefficients used in each of aspheric lens surfaces in this embodiment, where the aspheric surface profile is limited by the equation in the embodiment of FIG. 1a.

TABLE 10b

Embodiment of FIG. 10a
Aspheric coefficients

| Surface number | S1 | S2 | S3 | S4 | S5 | S6 | S7 |
|---|---|---|---|---|---|---|---|
| K | −3.02E+00 | −2.85E+01 | −2.35E+01 | −7.95E+00 | −3.23E+01 | 7.14E+01 | 5.70E+01 |
| A4 | 1.28E−02 | −7.51E−03 | −2.68E−02 | −1.85E−02 | −1.46E−02 | −1.94E−02 | −4.40E−02 |
| A6 | −5.98E−04 | 3.46E−03 | 1.20E−02 | 7.85E−03 | 1.46E−05 | −8.42E−04 | 1.65E−02 |
| A8 | 8.39E−04 | 1.44E−03 | −3.81E−03 | 7.35E−05 | −5.36E−03 | 1.95E−03 | −1.12E−02 |
| A10 | −9.53E−04 | −3.22E−03 | 1.63E−03 | −4.65E−03 | 2.10E−03 | −8.15E−03 | 2.46E−03 |
| A12 | 6.83E−04 | 2.35E−03 | −1.37E−03 | 6.05E−03 | 2.14E−03 | 8.49E−03 | 3.94E−04 |
| A14 | −2.81E−04 | −9.45E−04 | 9.61E−04 | −4.41E−03 | −3.31E−03 | −4.44E−03 | 1.83E−04 |
| A16 | 6.60E−05 | 2.15E−04 | −3.99E−04 | 1.90E−03 | 1.85E−03 | 1.32E−03 | −2.55E−04 |
| A18 | −8.22E−06 | −2.51E−05 | 8.80E−05 | −4.50E−04 | −4.99E−04 | −2.15E−04 | 6.56E−05 |
| A20 | 4.13E−07 | 1.11E−06 | −7.89E−06 | 4.54E−05 | 5.42E−05 | 1.51E−05 | −5.19E−06 |

| Surface number | S8 | S9 | S10 | S11 | S12 | S13 | S14 |
|---|---|---|---|---|---|---|---|
| K | 9.80E+01 | 9.72E+01 | −2.76E+00 | 9.80E+01 | 8.31E+00 | −3.44E+01 | −4.80E+00 |
| A4 | −5.17E−02 | −4.35E−02 | 1.08E−02 | 5.96E−02 | 3.38E−02 | −4.09E−02 | −3.22E−02 |
| A6 | 2.65E−02 | 2.87E−02 | −8.95E−03 | −2.84E−02 | −1.38E−02 | 7.47E−03 | 7.52E−03 |
| A8 | −9.27E−03 | −2.05E−03 | 6.55E−03 | 7.93E−03 | 2.22E−03 | −1.31E−03 | −1.49E−03 |
| A10 | −2.62E−03 | −7.39E−03 | −3.34E−03 | −1.99E−03 | −1.88E−04 | 2.25E−04 | 2.05E−04 |
| A12 | 3.50E−03 | 4.24E−03 | 9.31E−04 | 4.07E−04 | 2.23E−06 | −2.74E−05 | −1.79E−05 |
| A14 | −1.26E−03 | −1.11E−03 | −1.46E−04 | −5.81E−05 | 1.29E−06 | 2.09E−06 | 9.78E−07 |
| A16 | 2.20E−04 | 1.58E−04 | 1.36E−05 | 5.19E−06 | −1.39E−07 | −9.56E−08 | −3.26E−08 |
| A18 | −1.91E−05 | −1.19E−05 | −7.44E−07 | −2.60E−07 | 6.25E−09 | 2.42E−09 | 6.08E−10 |
| A20 | 6.67E−07 | 3.73E−07 | 1.91E−08 | 5.55E−09 | −1.08E−10 | −2.60E−11 | −4.89E−12 |

FIG. 10b illustrates a longitudinal spherical aberration curve, an astigmatic curve, and a distortion curve of the optical system of FIG. 10a. The reference wavelength of light of the astigmatic curve and the distortion curve is 555 nm. The optical system in this embodiment has high imaging quality according to the FIG. 10b.

Table 11 illustrates values of f/EPD, f*tan(HFOV), TTL/Imgh, TTL/f, |R5/R6|, TTH2/CT3, |f1/f5|, ET2/CT2, TTL/f1, EPD/R1, and sd61/sd52 of the optical systems of above embodiments, where f*tan(HFOV) is measured in mm.

TABLE 11

| | f/EPD | f*tan (HFOV) | TTL/ Imgh | TTL/f |
|---|---|---|---|---|
| Embodiment of FIG. 1a | 1.66 | 5.19 | 1.63 | 1.32 |
| Embodiment of FIG. 2a | 1.66 | 5.20 | 1.63 | 1.32 |
| Embodiment of FIG. 3a | 1.66 | 5.19 | 1.61 | 1.32 |
| Embodiment of FIG. 4a | 1.66 | 5.19 | 1.60 | 1.31 |
| Embodiment of FIG. 5a | 1.66 | 5.20 | 1.59 | 1.30 |

TABLE 11-continued

| Embodiment of FIG. 6a | 1.69 | 5.19 | 1.61 | 1.33 |
|---|---|---|---|---|
| Embodiment of FIG. 7a | 1.66 | 5.19 | 1.63 | 1.37 |
| Embodiment of FIG. 8a | 1.66 | 5.19 | 1.63 | 1.36 |
| Embodiment of FIG. 9a | 1.66 | 5.18 | 1.63 | 1.33 |
| Embodiment of FIG. 10a | 1.66 | 5.20 | 1.63 | 1.34 |

| | |R5/R6| | TTH2/CT3 | |f1/f5| | ET2/CT2 |
|---|---|---|---|---|
| Embodiment of FIG. 1a | 0.61 | 0.78 | 0.72 | 0.84 |
| Embodiment of FIG. 2a | 0.55 | 0.75 | 1.01 | 0.79 |
| Embodiment of FIG. 3a | 1.24 | 0.70 | 0.68 | 0.92 |
| Embodiment of FIG. 4a | 0.84 | 0.53 | 0.41 | 1.14 |

TABLE 11-continued

| | | | | |
|---|---|---|---|---|
| Embodiment of FIG. 5a | 1.39 | 0.65 | 0.07 | 1.13 |
| Embodiment of FIG. 6a | 0.97 | 1.10 | 0.71 | 0.23 |
| Embodiment of FIG. 7a | 1.07 | 0.68 | 1.38 | 0.22 |
| Embodiment of FIG. 8a | 0.58 | 0.67 | 1.42 | 0.24 |
| Embodiment of FIG. 9a | 1.07 | 0.73 | 0.72 | 1.09 |
| Embodiment of FIG. 10a | 1.37 | 0.73 | 1.37 | 0.92 |

| | TTL/f1 | EPD/R1 | sd61/sd52 |
|---|---|---|---|
| Embodiment of FIG. 1a | 1.32 | 1.21 | 1.16 |
| Embodiment of FIG. 2a | 1.32 | 1.22 | 1.18 |
| Embodiment of FIG. 3a | 1.32 | 1.22 | 1.13 |
| Embodiment of FIG. 4a | 1.31 | 1.20 | 1.15 |
| Embodiment of FIG. 5a | 1.30 | 1.22 | 1.10 |
| Embodiment of FIG. 6a | 1.33 | 1.20 | 1.14 |
| Embodiment of FIG. 7a | 1.37 | 1.15 | 1.15 |
| Embodiment of FIG. 8a | 1.36 | 1.16 | 1.13 |
| Embodiment of FIG. 9a | 1.33 | 1.21 | 1.08 |
| Embodiment of FIG. 10a | 1.34 | 1.22 | 1.14 |

As illustrated in Table 11, the optical systems provided in the disclosure satisfy the following expressions: f/EPD<1.7, f*tan(HFOV)>5.15 mm, TTL/Imgh<1.7, 1<TTL/f<1.5, 0.5<|R5/R6|<1.5, 0.5<TTH2/CT3<1.5, |f1/f5|<2, 0.2<ET2/CT2<1.3, TTL/f1 ≤ 1.5, EPD/R1<1.5, and sd61/sd52 ≤ 1.3.

The above embodiments are only a part embodiments of this disclosure, of course, the above embodiments cannot be used to limit the scope of this disclosure, the ordinary skill in the field can understand all or a part of the process to realize the above embodiments of the disclosure, and the equivalent changes made in accordance with the claims of this disclosure, still belong to the scope of the disclosure covered.

What is claimed is:

1. An optical system comprising, in order from an object side to an image side:
   a first lens with a positive refractive power, wherein the first lens has an object-side surface which is convex at an optical axis and an image-side surface which is concave at the optical axis and at a circumference;
   a second lens with a refractive power, wherein the second lens has an object-side surface which is convex at the optical axis and an image-side surface which is concave at the optical axis and at a circumference;
   a third lens with a refractive power;
   a fourth lens with a refractive power;
   a fifth lens with a refractive power;
   a sixth lens with a refractive power; and
   a seventh lens with a negative refractive power, wherein the seventh lens has an image-side surface which is concave at the optical axis and the image-side surface of the seventh lens has at least one inflection point;
   wherein the optical system satisfies the following expression:

$f/EPD<1.7$;

wherein f represents an effective focal length of the optical system, and EPD represents an entrance diameter of the optical system;
   wherein the optical system satisfies the following expression:

$TTL/\text{Img}h<1.7$;

wherein TTL represents a distance on the optical axis from the object-side surface of the first lens to an imaging surface of the optical system, and Imgh represents half of a diagonal length of an effective photosensitive area on the imaging surface of the optical system;
   wherein the optical system further satisfies the following expression:

$0.5<|R5/R6|<1.5$;

wherein R5 represents a radius of curvature of an object-side surface of the third lens at the optical axis, and R6 represents a radius of curvature of an image-side surface of the third lens at the optical axis;
   wherein the optical system further satisfies the following expression:

$0.5<TTH2/CT3<1.5$;

wherein TTH2 represents an air spacing distance on the optical axis from the second lens to the third lens, and CT3 represents a thickness of the third lens on the optical axis.

2. The optical system of claim 1, wherein the optical system satisfies the following expression:

$f*\tan(HFOV)>5.15$ mm;

wherein HFOV represents half of an angle of view of the optical system.

3. The optical system of claim 1, wherein the optical system satisfies the following expression:

$1<TTL/f<1.5$;

wherein TTL represents a distance on the optical axis from the object-side surface of the first lens to an imaging surface of the optical system.

4. The optical system of claim 1, wherein the optical system satisfies the following expression:

$|f1/f5|<2$;

wherein f1 represents an effective focal length of the first lens, and f5 represents an effective focal length of the fifth lens.

5. The optical system of claim 1, wherein the optical system satisfies the following expression:

$0.79<ET2/CT2<1.3$;

wherein ET2 represents a thickness of an edge of an optical effective area of the second lens, and CT2 represents a thickness of the second lens on the optical axis.

6. The optical system of claim 1, wherein the optical system satisfies the following expression:

$TTL/f1 \leq 1.5$;

wherein TTL represents a distance on the optical axis from the object-side surface of the first lens to an imaging surface of the optical system, and f1 represents an effective focal length of the first lens.

7. The optical system of claim 1, wherein the optical system satisfies the following expression:

$EPD/R1<1.5$;

wherein R1 represents a radius of curvature of the object-side surface of the first lens at the optical axis.

8. The optical system of claim 1, wherein the optical system satisfies the following expression:

$sd61/sd52 \leq 1.3$;

wherein sd61 represents a clear aperture of an object-side surface of the sixth lens at a maximum angle of view, and sd52 represents a clear aperture of an image-side surface of the fifth lens at the maximum angle of view.

9. A lens module, comprising:
a lens barrel;
an optical system comprising a plurality of lenses installed within the lens barrel, the plurality of lenses comprising, in order from an object side to an image side:
  a first lens with a positive refractive power, wherein the first lens has an object-side surface which is convex at an optical axis and an image-side surface which is concave at the optical axis and at a circumference;
  a second lens with a refractive power, wherein the second lens has an object-side surface which is convex at the optical axis and an image-side surface which is concave at the optical axis and at a circumference;
  a third lens with a refractive power;
  a fourth lens with a refractive power;
  a fifth lens with a refractive power;
  a sixth lens with a refractive power; and
  a seventh lens with a negative refractive power, wherein the seventh lens has an image-side surface which is concave at the optical axis and the image-side surface of the seventh lens has at least one inflection point;
  wherein the optical system satisfies the following expression:

$f/EPD<1.7$;

wherein f represents an effective focal length of the optical system, and EPD represents an entrance diameter of the optical system; and
a photosensitive element disposed at the image side of the optical system;
wherein the optical system satisfies the following expression:

$TTL/Imgh<1.7$;

wherein TTL represents a distance on the optical axis from the object-side surface of the first lens to an imaging surface of the optical system, and Imgh represents half of a diagonal length of an effective photosensitive area on the imaging surface of the optical system;
wherein the optical system further satisfies the following expression:

$0.5<R5/R6|<1.5$;

wherein R5 represents a radius of curvature of an object-side surface of the third lens at the optical axis, and R6 represents a radius of curvature of an image-side surface of the third lens at the optical axis;
wherein the optical system further satisfies the following expression:

$0.5<TTH2/CT3<1.5$;

wherein TTH2 represents an air spacing distance on the optical axis from the second lens to the third lens, and CT3 represents a thickness of the third lens on the optical axis.

10. The lens module of claim 9, wherein the optical system satisfies the following expression:

$f*\tan(HFOV)>5.15$ mm;

wherein HFOV represents half of an angle of view of the optical system.

11. The lens module of claim 9, wherein the optical system satisfies the following expression:

$1<TTL/f<1.5$;

wherein TTL represents a distance on the optical axis from the object-side surface of the first lens to an imaging surface of the optical system.

12. An electronic device, comprising:
a housing; and
a lens module disposed within the housing, wherein the lens module comprises:
  a lens barrel;
  an optical system comprising a plurality of lenses installed within the lens barrel, the plurality of lenses comprising, in order from an object side to an image side:
    a first lens with a positive refractive power, wherein the first lens has an object-side surface which is convex at an optical axis and an image-side surface which is concave at the optical axis and at a circumference;
    a second lens with a refractive power, wherein the second lens has an object-side surface which is convex at the optical axis and an image-side surface which is concave at the optical axis and at a circumference;
    a third lens with a refractive power;
    a fourth lens with a refractive power;
    a fifth lens with a refractive power;
    a sixth lens with a refractive power; and
    a seventh lens with a negative refractive power, wherein the seventh lens has an image-side surface which is concave at the optical axis and the image-side surface of the seventh lens has at least one inflection point;
    wherein the optical system satisfies the following expression:

$f/EPD<1.7$;

wherein f represents an effective focal length of the optical system, and EPD represents an entrance diameter of the optical system; and
  a photosensitive element disposed at the image side of the optical system;
wherein the optical system satisfies the following expression:

$TTL/Imgh<1.7$;

wherein TTL represents a distance on the optical axis from the object-side surface of the first lens to an imaging surface of the optical system, and Imgh represents half of a diagonal length of an effective photosensitive area on the imaging surface of the optical system;
wherein the optical system further satisfies the following expression:

$0.5<|R5/R6|<1.5$;

wherein R5 represents a radius of curvature of an object-side surface of the third lens at the optical axis, and R6 represents a radius of curvature of an image-side surface of the third lens at the optical axis;
wherein the optical system further satisfies the following expression:

$0.5<TTH2/CT3<1.5$;

wherein TTH2 represents an air spacing distance on the optical axis from the second lens to the third lens, and CT3 represents a thickness of the third lens on the optical axis.

13. The electronic device of claim 12, wherein the optical system satisfies the following expression:

$$f*\tan(HFOV) > 5.15 \text{ mm};$$

wherein HFOV represents half of an angle of view of the optical system.

14. The electronic device of claim 12, wherein the optical system satisfies the following expression:

$$1 < TTL/f < 1.5;$$

wherein TTL represents a distance on the optical axis from the object-side surface of the first lens to an imaging surface of the optical system.

15. The lens module of claim 9, wherein the optical system satisfies the following expression:

$$0.79 < ET2/CT2 < 1.3;$$

wherein ET2 represents a thickness of an edge of an optical effective area of the second lens, and CT2 represents a thickness of the second lens on the optical axis.

16. The lens module of claim 9, wherein the optical system satisfies the following expression:

$$sd61/sd52 \leq 1.3;$$

wherein sd61 represents a clear aperture of an object-side surface of the sixth lens at a maximum angle of view, and sd52 represents a clear aperture of an image-side surface of the fifth lens at the maximum angle of view.

17. The electronic device of claim 12, wherein the optical system satisfies the following expression:

$$0.79 < ET2/CT2 < 1.3;$$

wherein ET2 represents a thickness of an edge of an optical effective area of the second lens, and CT2 represents a thickness of the second lens on the optical axis.

18. The electronic device of claim 12, wherein the optical system satisfies the following expression:

$$sd61/sd52 \leq 1.3;$$

wherein sd61 represents a clear aperture of an object-side surface of the sixth lens at a maximum angle of view, and sd52 represents a clear aperture of an image-side surface of the fifth lens at the maximum angle of view.

* * * * *